United States Patent [19]

Upp et al.

[11] Patent Number: 5,040,170

[45] Date of Patent: Aug. 13, 1991

[54] SYSTEM FOR CROSS-CONNECTING HIGH SPEED DIGITAL SIGNALS

[75] Inventors: Daniel C. Upp, Southbury; William T. Cochran, Milford, both of Conn.

[73] Assignee: TranSwitch Corporation, Shelton, Conn.

[21] Appl. No.: 283,171

[22] Filed: Dec. 9, 1988

[51] Int. Cl.⁵ .............................................. H04J 14/08
[52] U.S. Cl. ....................................... 359/135; 370/99
[58] Field of Search ...................... 370/4, 84, 99, 58.1, 370/79

[56] References Cited

U.S. PATENT DOCUMENTS

| | | | |
|---|---|---|---|
| 4,613,969 | 9/1986 | Draayer | 340/825.8 |
| 4,644,535 | 2/1987 | Johnson et al. | 370/99 |
| 4,658,152 | 4/1987 | Walters | 370/99 |
| 4,667,320 | 5/1987 | Onno et al. | 340/825.79 |
| 4,697,262 | 9/1987 | Segal et al. | 370/84 |
| 4,719,624 | 1/1988 | Bellisio | 370/112 |
| 4,731,878 | 3/1988 | Vaidya | 370/1 |
| 4,760,573 | 7/1988 | Calvignac et al. | 370/99 |
| 4,763,123 | 8/1988 | Yasuda | 340/825.03 |
| 4,807,280 | 2/1989 | Posner et al. | 379/272 |
| 4,834,483 | 5/1989 | Arthurs et al. | 370/1 |
| 4,852,128 | 7/1989 | Lill | 370/99 |
| 4,855,999 | 8/1989 | Chao | 370/112 |
| 4,899,333 | 2/1990 | Roediger | 370/60 |
| 4,914,429 | 4/1990 | Upp | 340/825.8 |
| 4,928,275 | 5/1990 | Moore et al. | 370/102 |
| 4,935,921 | 6/1990 | Ishizaki et al. | 370/102 |

Primary Examiner—Douglas W. Olms
Assistant Examiner—Melvin Marcelo
Attorney, Agent, or Firm—David P. Gordon

[57] ABSTRACT

A modular, expandable, non-blocking system for cross-connecting high speed digital signals is provided. The system is capable of connecting DSn, CEPTn, and STSn signals as desired, with lower rate signals being included as components of the high-rate signals or terminating on low speed lines, as desired. The system accomplishes its goals by converting all incoming signals into a substantially SONET format, and by processing all the signals in that format. The signals are typically cross-connected in the substantially SONET format, although an expandable non-blocking wide band cross-connect module is provided which cross-connects any like signals. If the outgoing signal is to be in other than SONET format, the substantially SONET formatted signal is reconverted into its outgoing format. To create a complete system, various modules are utilized, including: add/drop multiplexer means for add/drop applications of DS-0, DS-1, CEPTn signals, etc.; a SONET bus interface; a virtual tributary cross-connect module which cross-connects virtual tributary payloads in space, time, and phase to generate new substantially SONET formatted signals; a wide band cross-connect module; a DS-3/SONET converter; and front end interfaces including a DS3 line interface, and various STSn interfaces. The modules may be mixed and matched as desired to accommodate a multitude of applications.

81 Claims, 16 Drawing Sheets

SYSTEM FOR CROSS-CONNECTING HIGH SPEED DIGITAL SIGNALS

BACKGROUND

The subject matter of this invention is related to the subject matters of inventions entitled "Switch Components and Multiple Data Rate Non-Blocking Switch Network Utilizing the Same" (issued as U.S. Pat. No. 4,914,429), "Virtual Tributary Cross Connect Switch and Switch Matrix Utilizing the Same" U.S. Ser. No. 07/283,178, and "System for Cross-connecting High Speed SONET Digital Signals" U.S. Ser. No. 07/283,172, all of which filed of even date, assigned to the assignee hereof, and all of which are hereby incorporated by reference herein.

This invention relates generally to cross-connect systems for cross-connecting high speed digital signals. The invention more particularly relates to a modular, non-blocking, expandable, digital cross-connect system capable of cross-connecting high-rate digital signals such as DS-3 and SONET and lower-rate signals such as DS-1, CEPT32, etc., where the lower-rate signals may be component of the high-rate signals, or may terminate on low speed lines.

The telecommunication network servicing the United States and the rest of the world is presently evolving from analog transmission to digital transmission with ever-increasing bandwidth requirements. Fiber optic cable has proved to be a valuable tool of such evolution, replacing copper cable in nearly every application from large trunks to subscriber distribution plants. Fiber optic cable is capable of carrying much more information than copper with lower attenuation.

While fiber optic cable represents the future in telecommunications, presently there remains an entire telecommunication network comprised of various cable types, served by equipment of different vintages, and run according to various coexisting transmission standards. While older standards, cables, and equipment will be eventually phased out, for the time being it is necessary that all the old and new standards, equipment and transmission lines be as compatible as possible. For example, in a wire plant, every signal should be connectable to every other signal. To achieve this, it is not enough to simply multiplex signals from lower to high orders and vice-versa. In addition to a mux/demux/ function, signal format conversion operations must be performed before connectibility can be achieved. For instance, a DS-3 signal cannot simply be connected to an STS-1 signal as these signals are at different rates and use different multiplexing formats.

The present devices for cross-connection and switching require rate and format conversion means and are typically incapable of passing the bandwidth which fiber optic cables can carry. Where wideband switching is attempted, the utilized devices are often not compatible with each other as they typically employ proprietary signaling schemes. Furthermore, the equipment conducting the wideband switching is typically limited in its range of sizes and features, thereby making network expansion difficult and costly.

In attempting to accommodate the protocols, equipment, and cables of the past while providing for the direction of the feature, various standards and system requirements relating to fiber optic cables have been adapted. In particular, the T1 Standards Committees of ANSI have provided a draft document ANSI T1.105-1988 dated Mar. 10, 1988 which sets forth specifications for a rate and format of signals which are to be used in optical interfaces. Additional details and requirements are set forth in Technical Advisory publications SR-TSY-000202, --000233, -000253, -000303 Issue 3 of Bell Communication Research (BellCore). The provided specifications detail the SONET (synchronous optical network) standard. SONET defines a hierarchy of multiplexing levels and standard protocols which allow efficient use of the wide bandwidth of fiber optic cable, while providing a means to merge lower level DS0 and DS1 signals in a common medium. In essence, SONET establishes a uniform, standardized transmission and signaling scheme which provides a synchronous transmission format that is compatible with all current and anticipated signal hierarchies. Because of the nature of fiber optics, expansion of bandwidth is easily accomplished.

While the SONET specifications provide standards which in theory permit cross-connection of high-rate digital carrier signals with other high-rate digital carrier signals (e.g. DS-3 and SONET), lower-rate digital signals with other lower-rate signals both carried by the high-rate signals (e.g. DS-2, DS-1, CEPT32, DS-0), and lower-rate signals carried by high-rate signals with lower-rate signals carried on lower-rate digital carriers (e.g. add-drop a DS-1 from a SONET or DS-3 carrier), systems for accomplishing the same are not known in the art. Clearly, then such systems are needed.

SUMMARY OF THE INVENTION

It is therefore an object of the invention to provide a cross-connect system capable of cross-connecting high rate digital carrier signals, and lower-rate components thereof.

It is a further object of the invention to provide a modular, non-blocking, expandable, SONET-compatible cross-connect system.

It is another object of the invention to provide a modular SONET-compatible cross-connect system capable of add/drop and multiplexing functions.

At the outset, it should be stated for purposes herein, that the term "substantially SONET formatted signals" shall be understood to be a signal in SONET form having its virtual tributaries as well as at least the A1, A2, H1, H2, and H4 overhead bytes defined. In all except the synchronous locked mode of the SONET signal, the V1 and V2 bytes must also be defined for the signal to be in substantially SONET format. The other overhead bytes need not be defined.

In accord with the objects of the invention, a modular cross-connect system is provided and generally comprises:

(a) means for receiving at least one signal chosen from at least one of a group consisting of DSn and CEPTn formatted signals;

(b) converting means coupled to said means for receiving for converting said received signal into a substantially SONET formatted signal; and (c) cross-connection means coupled to said converting means for cross-connecting said converted substantially SONET formatted signal.

Preferably the system also includes at a transmitting means for taking the substantially SONET formatted signal and transmitting it over one of a DSn, CEPTn or STSn compatible line. Where the signal is to be transmitted over a line other than a STSn compatible line, the substantially SONET formatted signal must be appropriately converted by a conversion means into an appropriate format.

In one embodiment, the switched, converted substantially SONET formatted signal is included as part of an outgoing SONET signal, and a SONET transmitting means is provided to properly format the entire signal including the converted, switched signal, into a SONET signal for transmission. In another embodiment, an add/drop means is utilized to at least partially disassemble the substantially SONET formatted signal so as to obtain therefrom a virtual tributary or a portion of a virtual tributary and to couple the obtained signal to an external transmission medium.

The switching means for cross-connecting the substantially SONET formatted signal may comprise either the wide-band cross-connect (WBX) component disclosed and claimed in U.S. Pat. No. 4,914,429 or the virtual tributary cross-connect component (VTX) disclosed and claimed in U.S. Ser. No. 07/283,178, or both.

Among the various components that may be utilized in the system are the WBX, the VTX, a DS3/SONET converter, a SONET bus interface, add/drop multiplexers, a SONET path terminator/originator, a SONET 3/1 mux/demux, a scramber/descrambler and SONET 24/3 mux/demux, a SONET line interface, and a DS3 line interface. All components except for the VTX are capable of working in "forward" and "reverse" modes. The DS3/SONET converter can take a DS3 signal, break it into twenty-eight DS1 signals, and stuff each DS1 into a virtual tributary of a substantially SONET formatted signal, as well as accomplishing the inverse, or take the entire DS3 signal and map it as specified into a substantially SONET formatted signal. The SONET bus interface is a serial/parallel converter which takes a serial SONET signal and produces a byte parallel SONET signal with a byte and multiframe clock on a parallel bus. The add/drop multiplexers basically drop off the contents of virtual tributaries to an external transmission line in one direction and add information from external transmission lines by converting them into VTs in the other direction. A first add/drop mux is an async add/drop mux which permits DS-1 signals to be coupled into SONET asynchronous mode VTs which can then be cross-connected into SONET or DS-3 signals. A second add/drop mux is a sync add/drop mux which permits adding and dropping DS-1 signals to and from byte synchronous VTs. A third add/drop mux permits add/drop of individual DS-0 channels from byte synchronous mode VTs. Additional add/drop multiplexers can be utilized to add/drop data to/from CEPT channels, etc.

A typical SONET line interface requires a 1.2 gigabit bit serial STS-24 signal and provides a byte parallel output with a STS-3 rate byte and frame clock. The scrambler/descrambler and SONET24/3 mux/demux provides scrambling and parity check functions as well as taking the SONET STS-24 signal and clocks from the line interface and providing eight constituent SONET STS-3 signals therefrom. The eight STS-3 signals are sent to the SONET3/1 mux/demux which takes a STS-3 signal and provides the three constituent SONET STS-1 signals therefrom. The SONET STS-1 signal is sent to the SONET path terminator/originator which interprets some of the path and transport overhead, zeroes out most of the overhead bytes, and sends the remaining signal to the cross-connect matrix stages. On the outgoing side, the terminator/originator accepts a signal from the matrix stages, inserts the path and transport overhead bytes and recalculates the pointer for the SONET payload envelope. The DS-3 line interface interfaces the system components with a DS3 channel by performing clock recovery, bipolar/unipolar conversions, B3ZS encoding/decoding, automatic gain control, equalization control, and bipolar violation counting.

The modularity of the system components permits a mixing and matching of components in order to obtain systems of various complexities and capabilities. For example, a rather simple use of the system would be to convert a DS-3 signal into a SONET signal. To accomplish the same, the following components would be utilized: a DS-3 line interface; the WBX (if desired); a DS3/SONET converter; and the front end components (typically the SONET path terminator/originator, SONET 3/1 mux/demux, scrambler/descrambler and SONET24/3 mux/demux, and SONET line interface) as required. The DS-3 signal would be received by the DS-3 line interface and be properly processed. The processed signal is connected (via the WBX, if desired) to the DS3/SONET converter where it would be stuffed into a substantially SONET formatted signal. The substantially SONET formatted signal would then be connected (again via the WBX, if desired) to the SONET path terminator/originator for front end processing.

Another simple use of the system would be to cross-connect DS-1 signals. To accomplish the same the following components would be utilized; an async add/drop mux, a SONET bus interface, and the VTX. The async add/drop mux would take the DS-1 signal, convert it to substantially SONET format (i.e. virtual tributary) and forward it to the bus interface. The bus interface would reformat the signal and forward it in its virtual tributary form to the VTX which would switch the converted DS-1 signal into a full-sized substantially SONET signal. The SONET signal would then be sent back through the SONET bus interface to an add/drop mux at a desired location. The add/drop mux would cause the virtual tributary to be dropped and reconverted into a DS-1 signal.

A more complex use of the system might be to take a SONET signal, cause some virtual tributaries to be used as part of a DS-3 signal, others to be used as part of a SONET signal, and yet others to be used as individual DS-1 signals. To accomplish the same, all of the components would be utilized. The front and components would receive the SONET signal and eventually forward it either directly to the VTX or to the WBX. If used, the WBX would forward the signal appropriately to the VTX where various new SONET signals would be generated. A first new SONET signal carrying some of the original VTs would be sent via the WBX (if used) to the front end circuitry and sent as a SONET signal. A second new SONET signal containing other original VTs would be sent to the DS3 /SONET converter where a DS3 signal would be generated. The DS3 signal would be sent out over a DS-3 line via the WBX (if used) and the DS3 line interface. Yet other virtual tributaries could be included in a third new SONET signal which would be forwarded to a desired add/drop mux via the SONET bus interface. At the add/drop mux, one or more virtual tributaries would be dropped and converted into DS-1 signals.

Additional objects and advantages of the invention will become apparent to those skilled in the art upon reference to the detailed description in conjunction with the provided FIGS.

BRIEF DESCRIPTION OF THE DRAWINGS

FIGS. 2a-1 and 2a-2 show a block diagram of the transmit side of the scrambler/descrambler SONET24/3 mux/demux component of the invention;

FIG. 8a is a logic diagram of a section of a switching matrix for use in the basic component of FIG. 5a;

FIG. 9b is a block diagram of the pointer calculation means, the memory means and the comparison means of the basic switching module of FIG. 9a;

DETAILED DESCRIPTION OF THE PREFERRED EMBODIMENT

Figure 1:
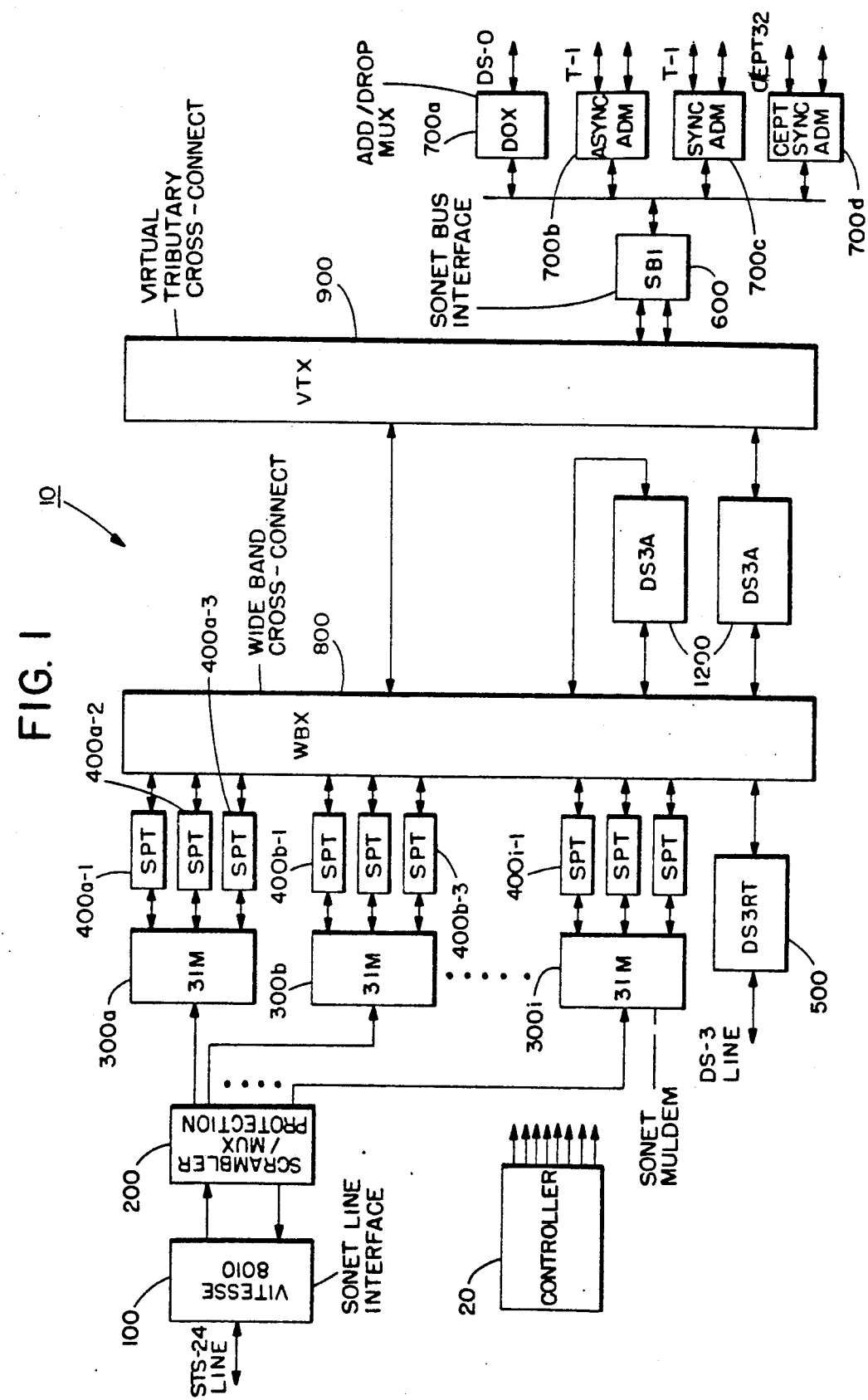
FIG. 1 is a block diagram of a modular, non-blocking, expandable, digital cross-connect system of the invention permitting the cross-connecting of high-rate digital signals such as DS-3 and SONET and lower-rate signals such as DS-1, CEPT32, etc., regardless of whether or not the lower-rate signals are components of the high-rate signals.

Turning to FIG. 1, a block diagram containing all of the primary components of the modular, non-blocking, expandable, digital cross-connect system 10 of the invention is seen. At the outset, it should be appreciated that all the components need not be present in order to practice the invention. The invention envisions using various subsets of the provided components in order to provide various functions. It is the modularity and expandability of the components which provide the practitioner with the powerful ability to increase both functionality and throughput as desired. It should also be recognized that while a controller 20 is required to act as the "brains" of the system 10, the controller 20 is not considered part of the invention. Indeed, various controllers are known in the art, and it is considered within the capabilities of one skilled in the art to provide or adapt a controller for use with the system invention.

In essence, there are ten functional components of the invention, with one of the ten (the add/drop mux) taking many interface 100, the scrambler/descrambler SONET24/3 mux/demux 200 (hereinafter "scrambler"), the SONET3/1 mux/demux 300 (hereinafter "3/1 mux"), and the SONET path terminator/originator 400 (hereinafter "SPT") are considered SONET "front end" components. Preferably, each, except the scrambler, is capable of interfacing with particular SONET lines as well as conducting all of the functions of the front end components which are in front of it. For example, the 3/1 mux 300 is capable of interfacing with a SONET-3 line and of conducting the functions of the scrambler 200 and SONET line interface 100 for a SONET-3 line.

The SONET line interface 100 is preferably an integrated circuit chip manufactures by Vitesse Company of Camarillo, Calif. under the designation Vitesse 8010. The basic function of the SONET line interface 100 is to interface with the 1.2 Gbit STS-24 line, find the framing pattern governing the line, and provide a SONET formatted byte parallel output at an STS-3 rate. In conjunction with the byte parallel output, the Vitesse 8010 provides a byte and frame clock.

The basic functions of the scrambler 200 on the receive side is to descramble the received byte-parallel STS-24 signal, conduct a parity check on the B1 byte of the SONET frame, and demultiplex of the STS-24 signal into eight STS-3 signals. On the transmit side, the scrambler 200 multiplexes up to eight STS-3 signals and scrambles the signals. As preferably implemented, the scrambler 200 is capable of processing both STS-24 and STS-12 signals. The scrambler can also facilitate an $N+1$ fault recovery mechanism by providing a ninth STS-3 signal input/output to which one of the STS-3 signals can be routed in the event of internal component failure of a 3/1 mux 300 or an SPT 400.

The 3/1 mux 300 basically demultiplexes an STS-3 signal into three STS-1 signals on the receive side, and multiplexes these STS-1 signals into an STS-3 signal on the transmit side. However, additional capacity is preferably built into the 3/1 mux so that it can conduct parity checking and scrambling and descrambling so that the 3/1 mux 300 can act as a line interface to an OC3 (SONET STS-3) line via a parallel to serial conversion such as that conducted by the Vitesses 8010.

The SPT 400 takes incoming SONET STS-1 signals and routes most of the path overhead and transport overhead to a microprocessor for processing while zeroing out that overhead for purposes of the data stream. Where the traffic on the two data communication channels is small, the SPT 400 provides some HDLC processing. On the transmit side, the SPT 400 inserts path and transport overhead into the substantially SONET formatted signals it receives. It also recalculates a SONET payload envelope pointer, as the SPT basically interfaces the time frame of the internal system 10 to the time frame of the external telecommunications network. Preferably, the SPT 400 also has the capabilities of scrambling/descrambling, parity checking and line interface, so that it can be used as a line interface to an STS-1 line.

Another front end component of system 10, is the DS-3 line transmitter/receiver 500 (hereinafter "DS3RT"). The DS3RT 500 serves as an interface between the system 10 and a DS-3 line of the telecommunications network. The DS3RT 500 receives a bipolar B3ZS line signal at 44.736 MHz, decodes the signal, conducts a bipolar to unipolar conversion, and provides automatic gain control and error rate counting. On the transmit side, the DS3RT conducts a B3ZS encoding and a unipolar to bipolar conversion.

The last "front end" components for the system 10 are the SONET bus interface 600 (hereinafter "SIB") and the various add/drop multiplexers 700a, 700b, ... (hereinafter "ADMs") which may also be considered "rear end" components. The SBI 600 provides essentially the same functions as the Vitesse 8010 component 100 except it interfaces with an STS-1 signal instead of an STS-24 signal. Thus, on the transmit side (out of the system), the SBI 600 takes a serial SONET signal and produces a byte parallel SONET signal with byte and multiframe clocks on a parallel bus, while on the receive side (into the system), the SBI 600 produces a bit serial SONET signal from the byte parallel signal. In addition, it extracts certain channels of the recovered signal that are used in data transmission and telephony signalling applications and inserts this information into the substantially SONET formatted signal.

The function of the ADMs 700 is to interface the system 10 which utilizes substantially SONET formatted signals with various lower rate lines, including DS-0, T-1, T-1c, T-2, CEPT, etc. Thus, each ADM is particular to the type of line with which it interfaces. ADM 700a interfaces with a DS-0 line. Hence, ADM 700a must interface with a synchronous virtual tributary, and must be capable of adding or dropping a DS-0 channel from such a synchronous virtual tributary. ADM 700b interfaces with an asynchronous T-1 line. Hence ADM 700b is capable of adding or dropping an asynchronous virtual tributary from a SONET signal. In a similar manner ADM 700c can add or drop a locked mode virtual tributary into or from a SONET signal, while ADM 700d can add or drop a CEPT signal into or from a SONET signal.

The switching components in the system 10 includes the wide band cross-connect switching network 800 (hereinafter "WBX") and the virtual tributary cross-connect switching network 900 (hereinafter "VTX"). The WBX is a non-blocking folded Clos switching network constructed out of a plurality of identical switch components. The switching network permits simultaneous switching of digital signals having different data rates, provided, of course, that signals of like composition are cross-connected. Expansion of the WBX 800 is accomplished by adding additional stages of the identical switch components. Clock skew and signal error due to the multiple stage which network are eliminated by regenerating a clock signal associated with the data at each stage of the network.

The VTX 900 is also a non-blocking switching network comprised of a plurality of identical switch components. The VTX receives substantially SONET formatted signals, and switches the VTs of the SONET signal is space, time, and phase to create new substantially SONET formatted signals. Expansion of the switching network 900 is accomplished by adding additional identical switch components.

The last primary component of the entire system 10, is the DS3/SONET converter 1200. The DS3/SONET converter 1200 serves in either of two capacities. In a first mode, the DS3/SONET converter 1200 receives a DS-3 signal (as processed by the DS3 line interface 500) and stuffs the signal into a substantially SONET formatted signal. In a second mode, the DS3/SONET converter 1200 receives the processed DS-3 signal, breaks the signal into its component parts (typically DS-1 signals), and stuffs the component parts into SONET formatted virtual tributaries. In either mode, the DS3/SONET converter 1200 also accomplishes the inverse functions. Also, in either mode, it accomplishes error and bit parity monitoring functions.

As will be discussed hereinafter, various subcombinations of the various components of system 10 provide different capabilities. The modularity of the system 10 permits a user to determine which components are pertinent to the user's particular requirements and to arrange those components in a desired arrangement. However, the modularity also permits the user to add identical or different components should the required throughput or capabilities change over time.

Figures 1, 2A:
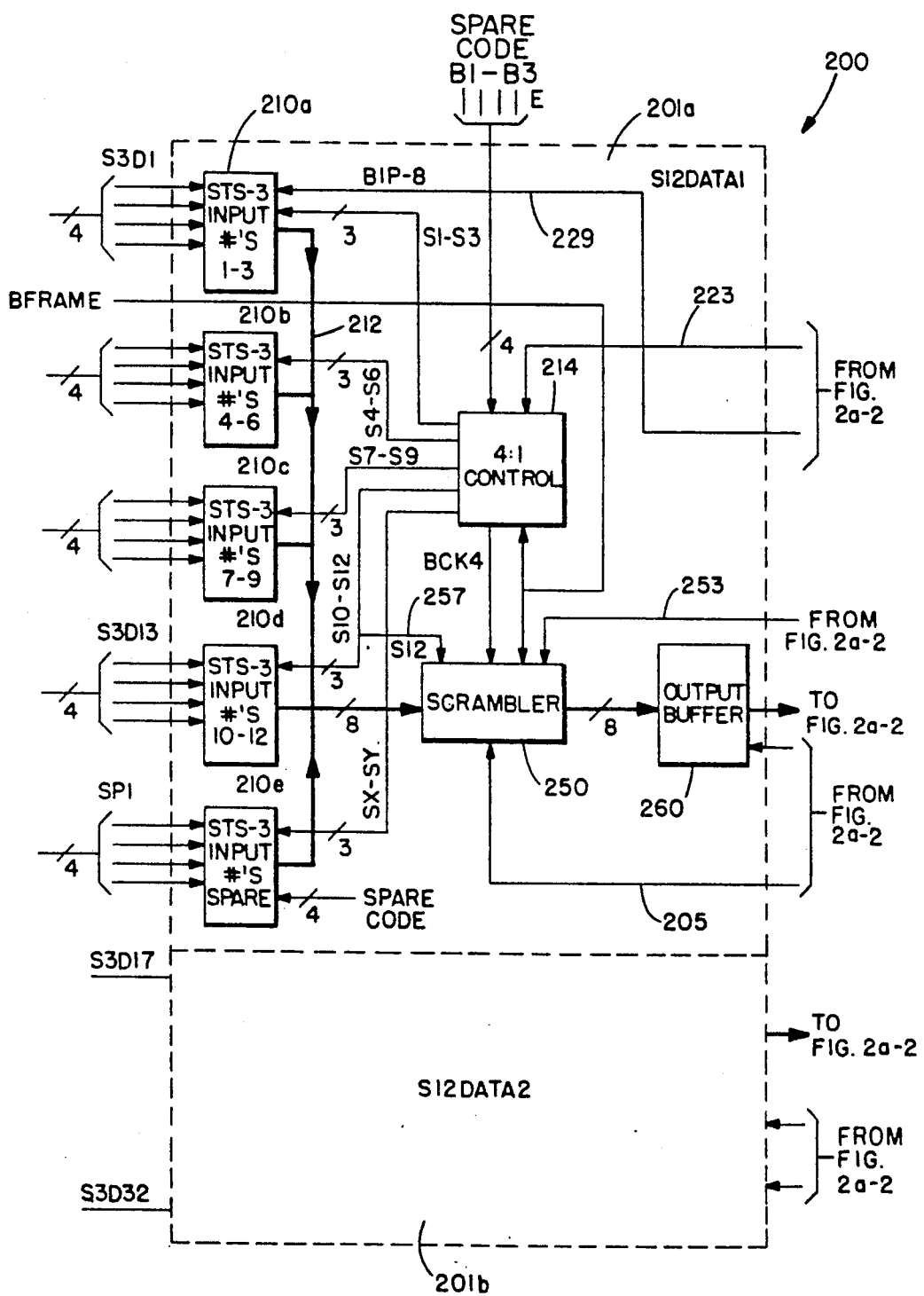
Figures 2, 2A:
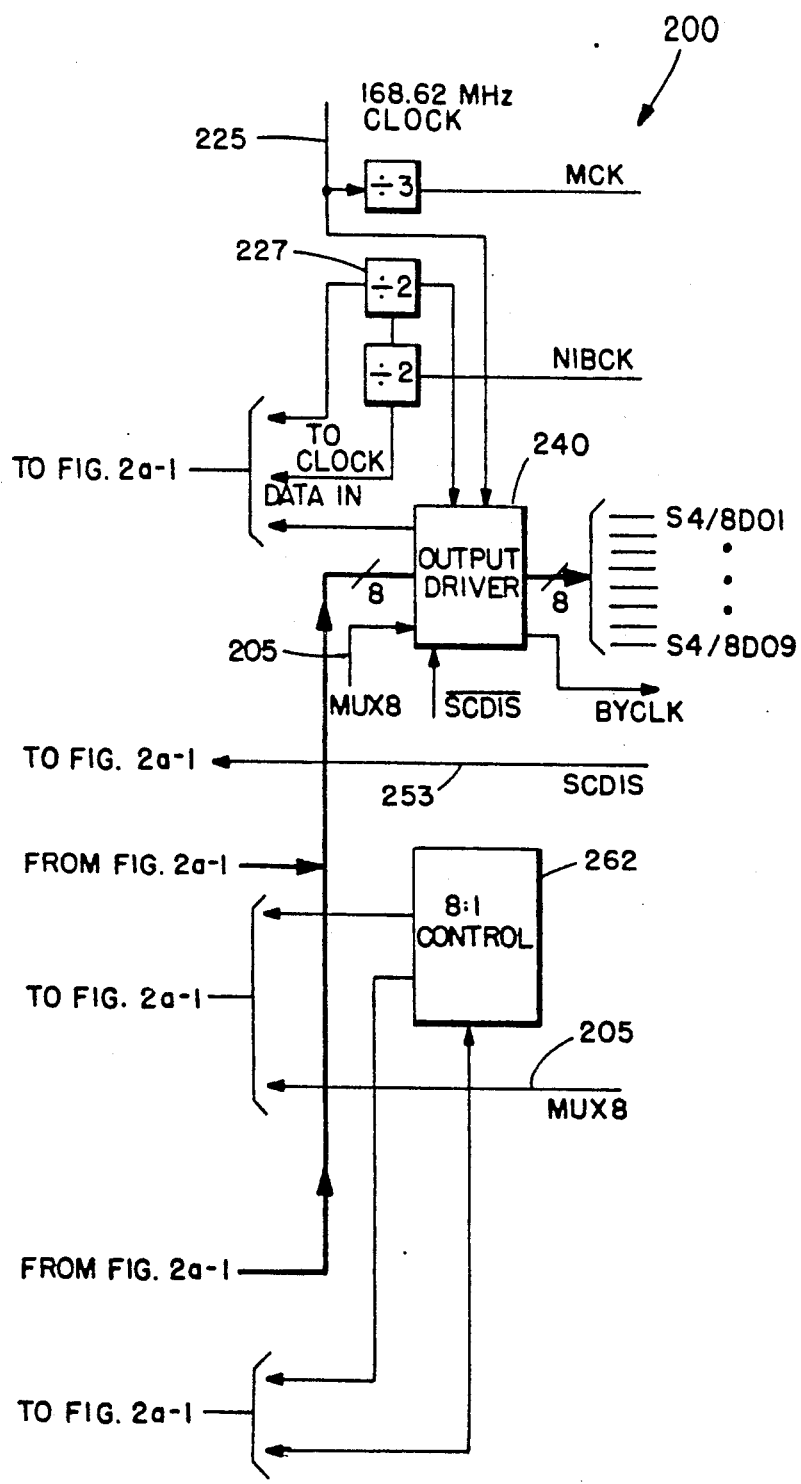
Figure 2B:
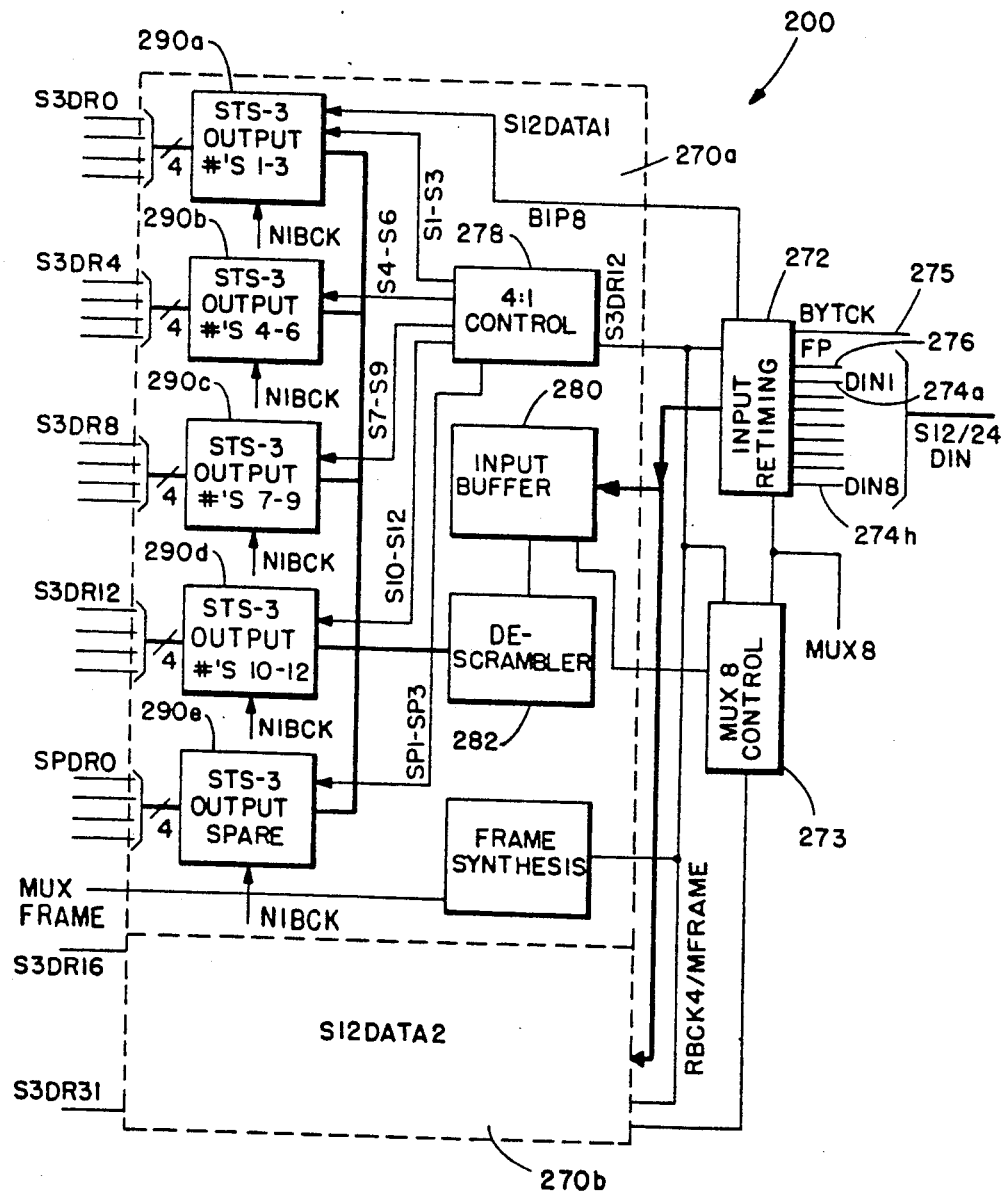
FIG. 2b is a block diagram of the receive side of the scrambler/descrambler SONET24/3 mux/demux component of the invention.

Turning to FIGS. 2a and 2b, the details of the transmit and receive sides of the scrambler 200 are respectively seen. As seen in FIG. 2a, scrambler 200 is substantially divided into two nearly identical sections 201a and 201b, each of which is capable of multiplexing four STS-3's at 38.88 MNibble/sec into a single STS-12 at 77.76 Mbytes/sec. The Mux8 control 205 is utilized to control whether two STS-12 signals are then multiplexed together as a single STS-24 signal at 155.52 Mbytes/sec.

The STS-3 input blocks 210a–210e of scrambler section 201a accepts four bit nibbles of data with the most significant nibble being received first. The blocks form nibbles into bytes which are placed onto a transmit byte bus 212 under timing control of 4:1 controller 214 which sequentially enables each block. The input blocks 210 of section 201b are identically controlled, except that section 201b includes only four input blocks. Thus, section 201a is seen to have a spare input block 210e which provides redundancy in case any of the other eight input blocks 210 are not properly functioning. The spare is told via the spare code control lien 214, which of the eight input blocks it is replacing. This information is required, as each of the input blocks encodes SONET C1 bytes indicative of the STS-1 signals it is processing (values of one to twenty-four).

The 4:1 controller 214 utilizes the muxframe* 221 and a 77.76 MHz clock 223 in controlling the input blocks 210 of section 201a. The muxframe* signal is used to set the frame of the resulting generated SONET-12 and is a delayed version of the muxframe signal 222 which is generated by the receive section of the scrambler 200. The 77.76 MHz signal 223 is derived from a 155.52 MHz clock 225 which is divided by divider 227. The 77.76 MHz signal is used as the scanning rate of the input blocks 210 by 4:1 controller 214. Where the spare input block 210e is being utilized, the controller 214 switches the control leads from the replaced input to the spare block 210e. If the spare is to replace a block in section 201b, spare block 210e is connected to the byte bus of section 201b. Also, if the spare block 210e is to replace block 210a in section 201a, the spare block 210e must be connected to bus 229 which sends bit interleaved parity information from output driver 240 to the input block generating the SONET-1 B2 byte. The B2 byte, which is located in STS-1 #1, contains the bit interleaved parity of the previous frame. The bit interleaved parity information is determined in the output driver block 240 after scrambling is accomplished by scrambling means 250.

The purpose of the scrambler means 250 is to improve the statistics of the output signal. Scrambler means 250 receives the muxframe* control 221, the 77.76 MHz clock 223, disable scramble control 253, mux8 control 205, and the S12 control 257 which indicates when the twelfth STS-1 signal has been scanned by controller 214. Scrambler 250 also receives all the data from the input blocks, 210, and based on the various control signals, properly scrambles them and forwards them to output buffer 260. Output buffer 260, under control of 8:1 controller 262 accommodates the multiplexing of the two STS-12 signals, as a similar output buffer is locate in section 201b.

As is indicated in FIG. 2a, the output driver 240 and 8:1 controller 262 are common to both sections 201a and 201b of the transmit side of scrambler 200. As aforementioned, the output driver calculates the value of the BIP-8 byte over the entire frame of the STS-12 or STS-24 signal. The output driver also provides proper timing and waveforms to the output which will either assume a 77.76 or 155.52 MByte/sec signal depending on the mux8 control signal (i.e. whether a STS-12 or STS-24 signal is being generated).

Turning to FIG. 2b, the receive side of scrambler 200 is seen in some detail. The receive side, in a manner similar to the transmit side, is substantially divided into two sections 270a and 270b. Common to both sections 270 is an input retiming block 272 and 8:1 demux control 273. The demux control 273 is active only when the mux8 control 205 is true. Otherwise, demux control 273 and section 270b are powered down. Demux control 273 demultiplexes the incoming STS-24 signal into two STS-12 signals which are then demultiplexed into two sets of four STS-3 signals under control of the 4:1 controllers 278. Controllers 278 utilize a framing signal received from the input retiming block 272 in accomplishing the same.

The retiming block 272 receives an STS-24 signal as eight STS-3 signals with eight bit bytes on up to eight leads (DINs 1-8) 274a-274h. It also receives a byte clock 275 at 77.76 or 155.52 MHz depending on the mux8 signal 205, and a framing pulse signal 276 coincident with byte A2 of STS-1 #7 (i.e. the third byte after the start of the frame). The output of retiming block 272 are clock signals to the 4:1 demux 278, and data to input buffer 280. Buffer 280 stores the incoming data and retransmits it to a descrambling means 282.

Data from the descrambler is forwarded to STS-3 output blocks 290 which receive the STS-3 signals at 19.44 Mbytes/sec and output signals at 38.88 MNibbles/second. When scrambling is enabled, the STS-3 output block 290a performs parity error calculations from the B1 byte and from the BIP-8 signal received from the input retiming block 272. As with the transmit side, the receive side of scrambler 200 includes a spare block 290e for allowing possible failure on one of the other blocks. If the spare block replaces output block 290a, it must perform the parity check and error insertion for STS-1 #1. If the spare block replaces an output block in section 270b, the byte bus of the spare output is connected to the byte bus of the lower 4:1 demux control.

Figure 3A:
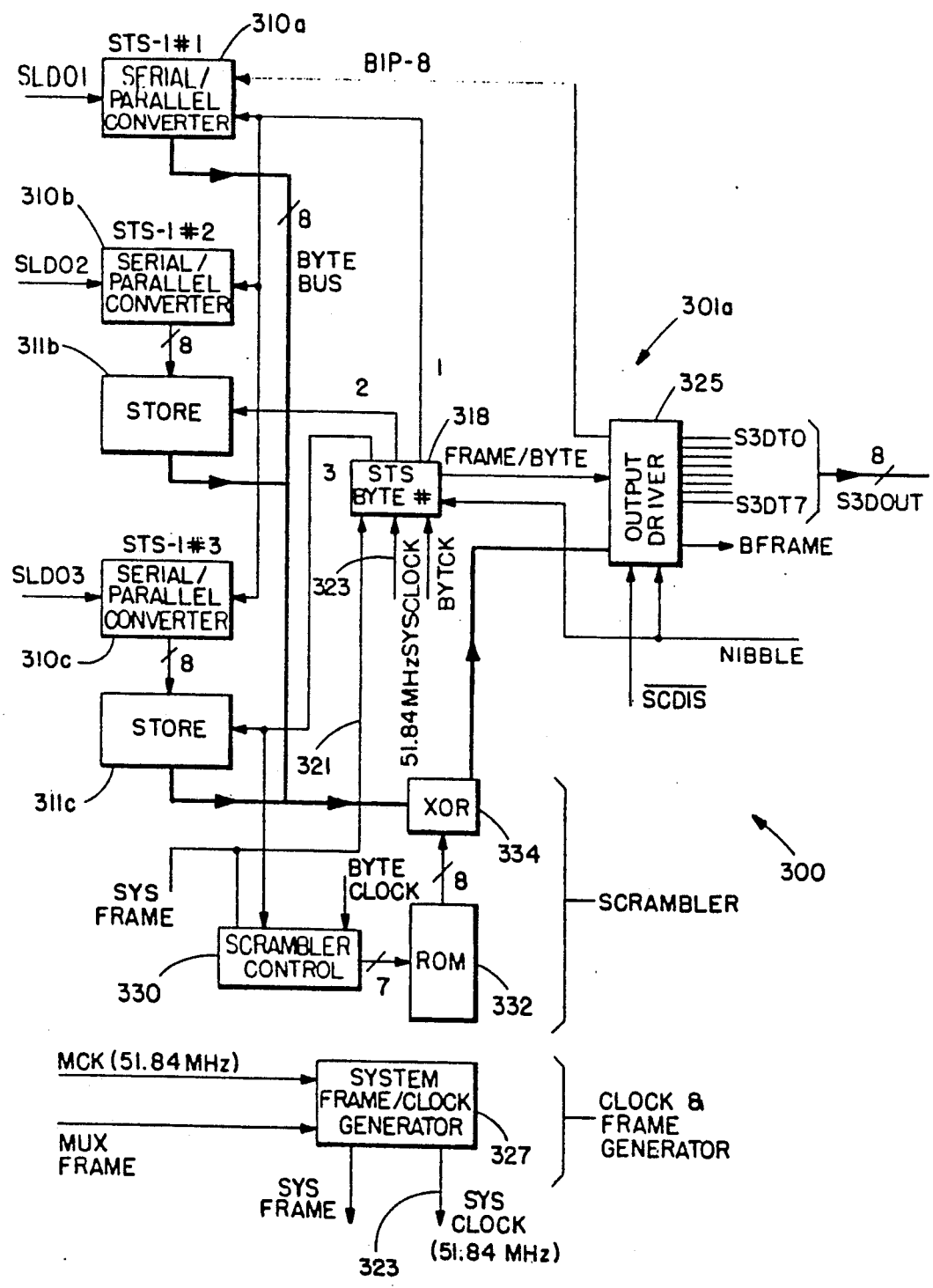
FIG. 3a is a block diagram of the transmit side of the SONET3/1 mux/demux component of the invention.

A block diagram of the transmit side 310a of the 3/1 mux component 300 is seen in FIG. 3a. On the transmit side, data is received by three serial/parallel converter 310a-310c from three SPTs (see FIG. 4) as bit serial data clocked at 51.84 MHz. The serial/parallel converters 310 convert the STS-1 bit serial signals into STS-1 byte parallel signals and place the bytes on byte bus 314 under the control of STS byte number generator 318.

The STS byte number generator 318 is able to control the serial/parallel converters 310 because it receives a delayed system frame clock 321 and a 51.84 MHz clock 323 and generates therefrom the timing for the bytes from the three serial/parallel converters. The 51.84 MHz clock 323 is received from a clock generator 327 which divides an available 155.52 MHz clock by three. The system frame clock (SYS FRAME), on the other hand may either be generated internally from a frame indication input (MUXFRAME), or may be directly available.

In controlling the signal flow, the STS byte number generator 323 enables each serial/parallel converter 310 cyclically. Because the three STS-1 signals arrive in sync, serial/parallel converters 310b and 310c are provided with associated storage means 311b and 311c which prevent overflow while permitting the converters 310b and 310c to wait their turns. The STS byte number generator 323 also sends its byte clock and system frame to the output driver block 325. The byte clock is set at 19.44 MHz (three-eighths the 51.84 MHz clock) except when the Nibble control input 329 is at ground; then the byte clock is set at 38.88 MHz (three-quarters the 51.84 MHz clock). The output driver block 325 retimes a necessary and provides TTL outputs. The output driver 325 the byte clock and frame as inputs (via STS byte number generator 318), as well as the data byte bus 314 and nibble control 329. When the nibble control 329 as at ground, only three output pins of the driver 325 are utilized and bytes are transmitted as two four-bit nibbles at 38.88 MNibbles/sec which is twice the byte rate. A second control 337 is set when scrambling is required (i.e. The component 300 is to interface directly with an STS-3 line). In such situations, BIP-8 is calculated and passed to the STS-1 number one block 310a, scrambling is enabled, and all eight output pins of driver 325 are utilized for transmission of eight-bit bytes at 19.44 Mbytes/sec.

As previously indicated, the 3/1 mux component 300 also has the capability of scrambling the signal which is to be transmitted so that the component can interface with a STS-3 line. Thus, scrambler controller 330 is provided, along the ROM 332 and an XOR block 334. The scrambler controller 330 controls the ROM addressing so that framing bytes and STS identification bytes do not get scrambled. The ROM 332 provides a look-up table for byte-wide scramble values and provides an output to the XOR block 334 at the falling edge of the byte clock. The XOR block basically adds in modulo two the data coming from byte bus 314 with the eight bits of data from the scrambler ROM 332. Where scrambling is not required (i.e. where the output of 3/1 mux component 300 is to the scrambler 200), the ROM outputs only zeroes. In this manner, the XOR block 334 passes the data bytes to output driver 325 unaltered.

Figure 3B:
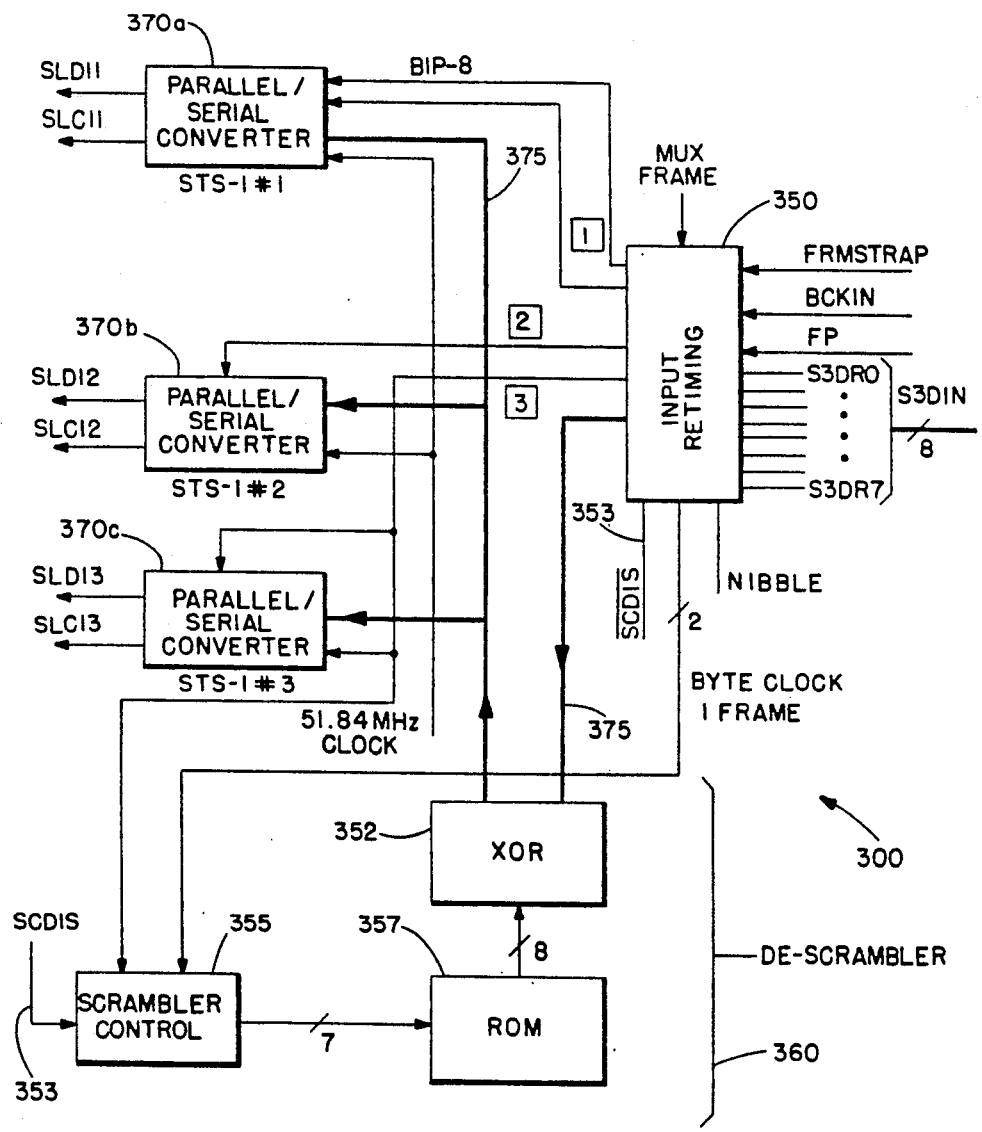
FIG. 3b is a block diagram of the receive side of the SONET3/1 mux/demux component of the invention.

Turning to FIG. 3b, the receive side of the 3/1 mux component is seen. The incoming signal, when received from a STS-3 line, is received as a scrambled eight-bit parallel STS-3 signal, with a mux frame clock indicating the first byte of the frame. Where the incoming signal is received from scrambler component 200, the received signal is an unscrambled four-bit nibble signal. Regardless, the input retiming block 350 receives the data signal, controls signals and clocks, and generates its own control and clocks while outputting the data signal to XOR block 352. In particular, where descrambling must be accomplished, a BIP-8 value is calculated and sent to the STS-1 #1 transmit block 370a for a parity check. Likewise, a scrambler enable control signal 353 is sent to the scrambler control 355 of descrambler 360, which is comprised of scrambler control 355, ROM 357 and XOR block 352. The scrambler control 355, ROM 357 and XOR block 352 all function in manners similar to their counterparts on the transmit side of the 3/1 mux component 200. Thus, where descrambling is required, XOR block 352 performs its modulo two function on the incoming data on data bus 375 (nibble signals being converted to byte format) and values provided by ROM 357 under control of scrambler control 355. Where descrambling is not required, zeroes are provided by ROM 357 to XOR block 352 and the data passes unprocessed to the parallel/serial converters 370. The parallel/serial converters 370a, 370b, and 370c are essentially identical, and convert the parallel signals on bus 353 into serial 51.84 MHz data and clock signals which are sent to SPT components 400.

Figure 4:
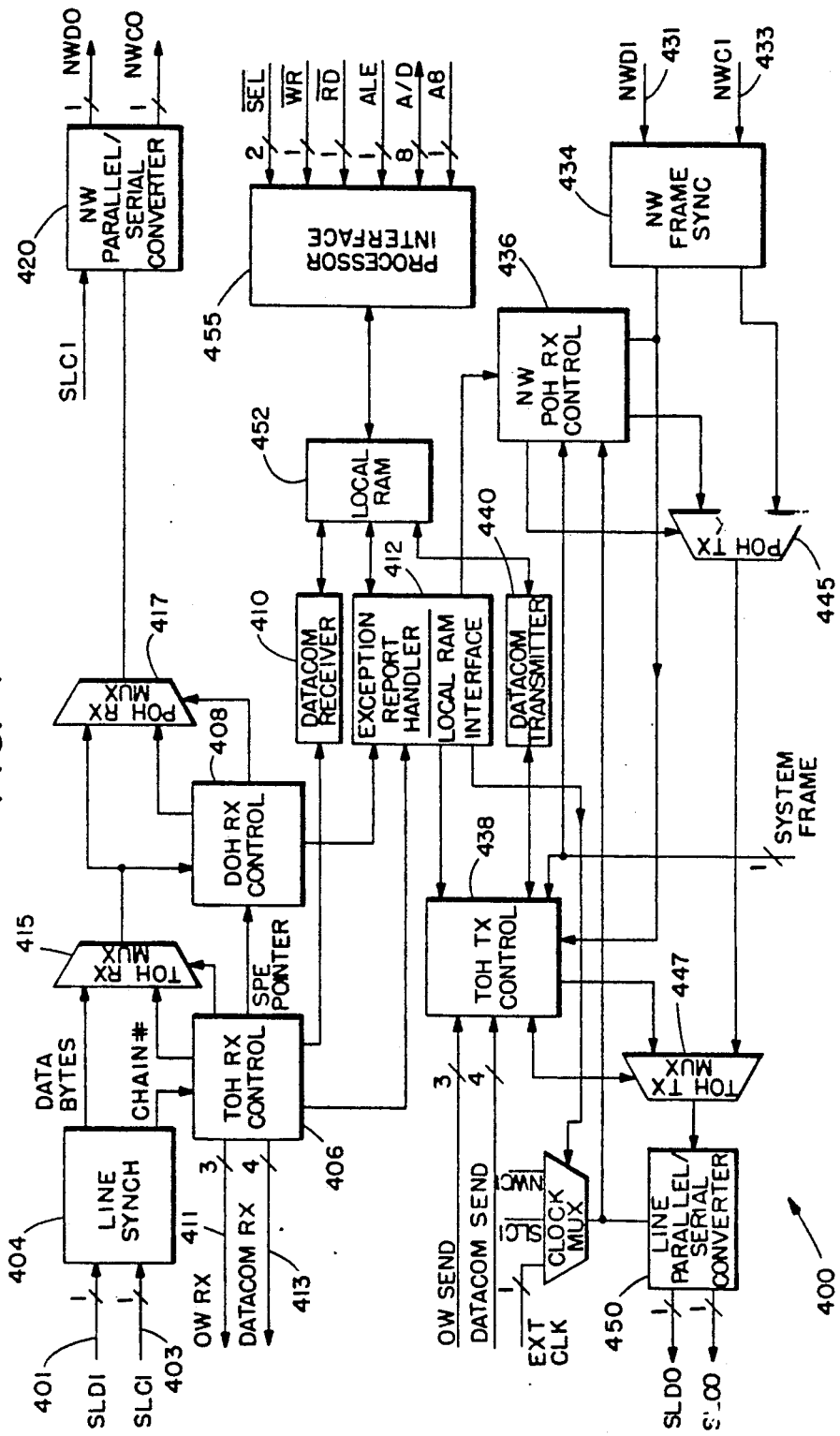
FIG. 4 is a block diagram of the SONET path terminator/originator component of the invention.

The SONET path terminator (SPT) component 400 of the invention is seen in block diagram form in FIG. 4. On the receiving end, a bit-serial SONET STS-1 signal at 51.84 Mb/s and a clock are received on lines 401 and 403 by the line synch block 404 which searches for and tracks framing bytes A1 and A2 of the SONET frame. Line synch block 404 sends the transport overhead bytes of the SONET signal along with their byte number to the transport overhead receive control 406 (TOH RX). Line synch block 404 also monitors for loss of signal, loss of frame, loss of pointer, and receives the STS-line Alarm Indication Signal (AIS). The detection of loss of signal, frame, or pointer causes a bit to the set in the status register of the exception report handler block 412 which results in later action, as well as causing immediate insertion of STS-path AIS forward, as required. AIS is cleared when the condition clears. Where the SPT is used as a direct interface to an STS-1 (OC-1) line, the line sync block also conducts BIP-8 B1 parity generation and checking and line descrambling.

The transport overhead bytes received by the TOH RX 406 are preprocessed by conducting simple functional tasks, and routing signals to other modules for further processing. The path overhead relating to the virtual tributaries in the STS-1 signal is forwarded to the path overhead receive control (POH RX) 408, while other signals are delivered to the datacom receiver 410 and the report handler 412. The TOH RX 406 also generates signals for the orderwire and exitdata ports 411 and 413, and returns some data signals into the data path via TOH mux 415. The POH RX 408 module functions in much the same way as the TOH RX 406 in that it extracts information from incoming bytes, routes the information to appropriate support modules and back into the data stream (via POH RX mux 417), and passes most of the data onto the next stage. In particular, the data stream is sent to the network parallel/serial converter 420 which takes the byte data stream signal and converts it into a bit serial 51.84 Mbit/sec signal for transmission to a switching (cross-connect) component.

The transmit side of the SPT 400 is basically the same as the receive side except that instead of stripping and analyzing the overhead, the transmit side inserts overhead into a substantially SONET formatted signal. The SPT 400 receives at its network frame sync (NFS) module 430 a bit serial 51.84 Mbit/sec data signal 431 typically from the WBX 800 or VTX 900 along with a synchronized clock signal 433. The NFS module searches for and locks to the synchronization dictated by SONET bytes A1 and A2, and uses the SONET byte locations to extract the SONET payload envelope as well as to keep track of the frame byte numbers of the incoming data. The NFS also monitors for loss of signal, frame, and pointer, and for the network STS-path AIS, any of which causes specified condition bits to be set. The data bytes of the received signal are then passed to the next stage of the transmit side via the path overhead transmit mux (POH TX) 445. However, the byte location information is sent to the path overhead transmit control 436 so that bytes, J1, C2, G1, F2, Z3, Z4, and Z5 can be added to the substantially SONET formatted signal via POH TX mux 445. In addition, the POH transmit control 436 calculates BIP-8 B3 for the received signal so that any errors can be reported to the exception report handler 412 and further recalculates a new BIP-8 B3 for insertion into the SONET signal.

In addition, the POH TX control 436 conducts pointer calculations to permit the envelope of the outgoing line STS-1 signal to be formed. The SONET payload envelope signal received must be retimed to the selected line output clock by the recalculating of a new STS-1 pointer value. Bit and frame clocks for the new output STS-1 signal may come from external or internal sources. Thus, new values for the STS-1 pointer bytes H1, H2, and H3 are provided, and a small FIFO is included to allow for stuff operations on the outgoing signal. The resulting signal exiting the POH TX mux 445 is an STS-1 signal properly timed to the line output clock, with a proper SPE, proper path overhead information, and with "old" transmit overhead information. The TOH information, however, is replaced at the TOH TX mux 447 by the TOH TX control 438.

The TOH transmit control module 438 conducts the final signal processing needed for the generation of an output STS-1 signal. Its sole required calculation is of the BIP-8 B2 parity, although it can insert new TOH overhead bytes as desired. The new bytes are inserted into the STS-1 signal at TOH transmit mux 447, and the STS-1 byte signal is sent to the line parallel to serial converter 450 which converts the signal into a bit serial 51.84 Mbit/sec STS-1 signal with an accompanying clock signal.

As previously indicated, the exception report handler (ERH) 412 is provided to detect specified changes in system information. Upon detection of changes, the ERH flags the control system via processor interface 455 and provides the status information (contained in associated RAM 452) to the control system. Contained within the ERH RAM space are: a status byte including a test bit for test mode, an error bit and a parity bit; RX and TX control and routing bits; current TX values for TOH/POH control bytes; RX last and current values of the TOH/POH control bytes; 64 bytes of a J1 buffer; 192 bytes of TX frame buffer; and 192 bytes of RX frame buffer.

Also provided in the SPT module 400 are the datacom RX module 410 and the datacom TX module 440 which provide for both receiving and generating a single packet at a time on either the Section or Line datacom channels (found within the SONET TOH). For applications where small volumes of message traffic are anticipated, these internal modules are adequate, while for application requiring larger message volumes, ports to external datacom receive and transmit circuits are provided.

As described above, the DS3 line interface component 500 generally transmits and receives a bipolar B3ZS line signal at 44.736 MlHz. On the receive end, component 500 conducts a bipolar to unipolar conversion, decodes the line signal, and provides automatic gain control and error rate counting. On the transmit side, the DS3RT conducts a B3ZS encoding and a unipolar to bipolar conversion. In order to accomplish these tasks, the received signal is fed to threshold detectors 505 which detect and report the presence of positive and negative pulses as well as reporting loss of signal if no threshold is exceeded for about ten milliseconds. When a threshold is exceeded, the detectors send the data and a positive or negative indication to B3ZS receiver 410. The B3ZS receiver 510 detects bipolar violations and notifies the bipolar violation counter 515 of the same, and conducts the bipolar-unipolar conversion. The unipolar data is then sent to data/clock alignment means 520 which associates a clock with the unipolar data, and sends the clocked data to output select circuit 525. The output select circuit 525 switches the DS-3 signal and clock to one of two outputs to provide alternate paths for the signals should that be necessary. Of course, instead of sending the DS-3 data out via the output select 525, the data may be looped back via loopback circuit 530.

On the transmit side, DS-3 data being received by interface component 500 is received at input select 540 and is forwarded to AIS generator 545. AIS generator 545 generates the AIS alarm when the received data meets certain criteria. The AIS alarm is also generated when a loss of signal is recognized by the threshold detectors 505. Data leaving AIS generator 545 is forwarded to the B3ZS transmit block 550 which examines the clocked data and determines which zeroes must be changed to ones, and what the polarity of each binary one should be. That information is forwarded to line driver 555 which generates the bipolar B3ZS coded DS-3 signal.

Figure 6:
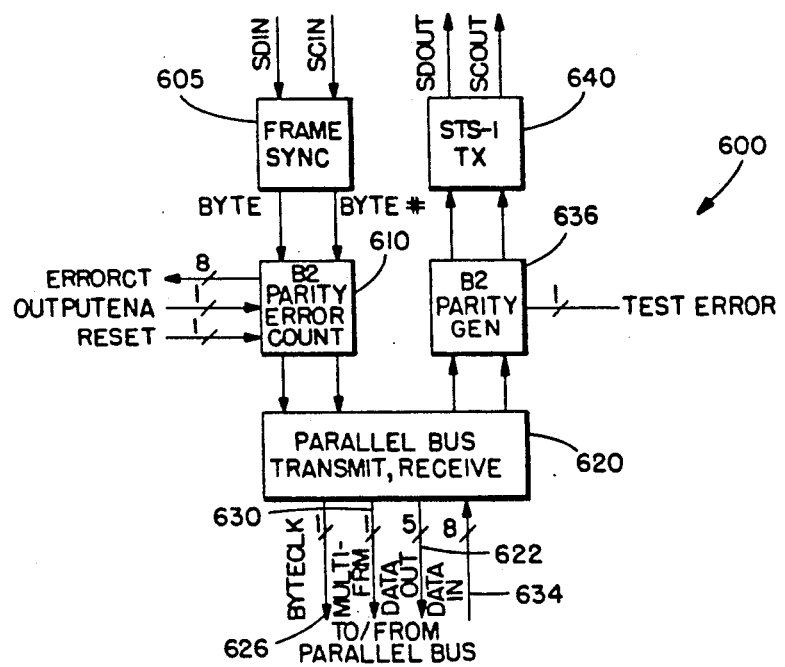
FIG. 6 is a block diagram of the SONET bus interface component of the invention.

Turning to the "back end" components of system 10, one embodiment of the SONET bus interface 600 of the system is seen in FIG. 6. In essence, the SONET bus interface 600 is a serial/parallel converter which converts a bit serial substantially SONET formatted STS-1 signal into a byte parallel substantially SONET formatted STS-1 signal. The SONET bus interface 600 receives the SONET data signal and clock signal at the frame sync block 605 which searches for the framing bytes A1 and A2, as well as monitoring for loss of frame. The received data is buffered and presented in byte format, along ith a byte number and byte block to the parity error circuit 610. Parity error circuit 610 performs a continuous B3 error count. When the control signal OUTPUTENA is active, the current error count of parity error circuit 610 is presented to a system controller (not shown) via eight bit line ERRORCT. When the control signal RESET is active, the current error count is reset to zero.

The bytes of the SONET signal, along with the byte clock and receiver 51.84 Mb/s clock are then sent to the receiver section of parallel bus interface 620. The receive section outputs the data bytes on the output bus 622, and generates a byte clock and a multiframe clock which are respectively output on buses 626 and 630. The period of the multiframe clock is that of the received multiframe signal H4 and the multiframe clock is synchronous with the H4 signal. If the multiframe signal is absent, the parallel bus interface 620 generates a four-frame multiframe on its own.

On the transmit side of parallel bus interface 620, information from add/drop multiplexers 700 is received via the byte parallel input bus 634. The byte information is passed to the B3 parity generator 636 which calculates a value for the B3 byte. The byte parallel data is then sent to STS-1 transmitter 640 which generates a bit serial STS-1 signal therefrom along with an associated clock.

Figure 7:
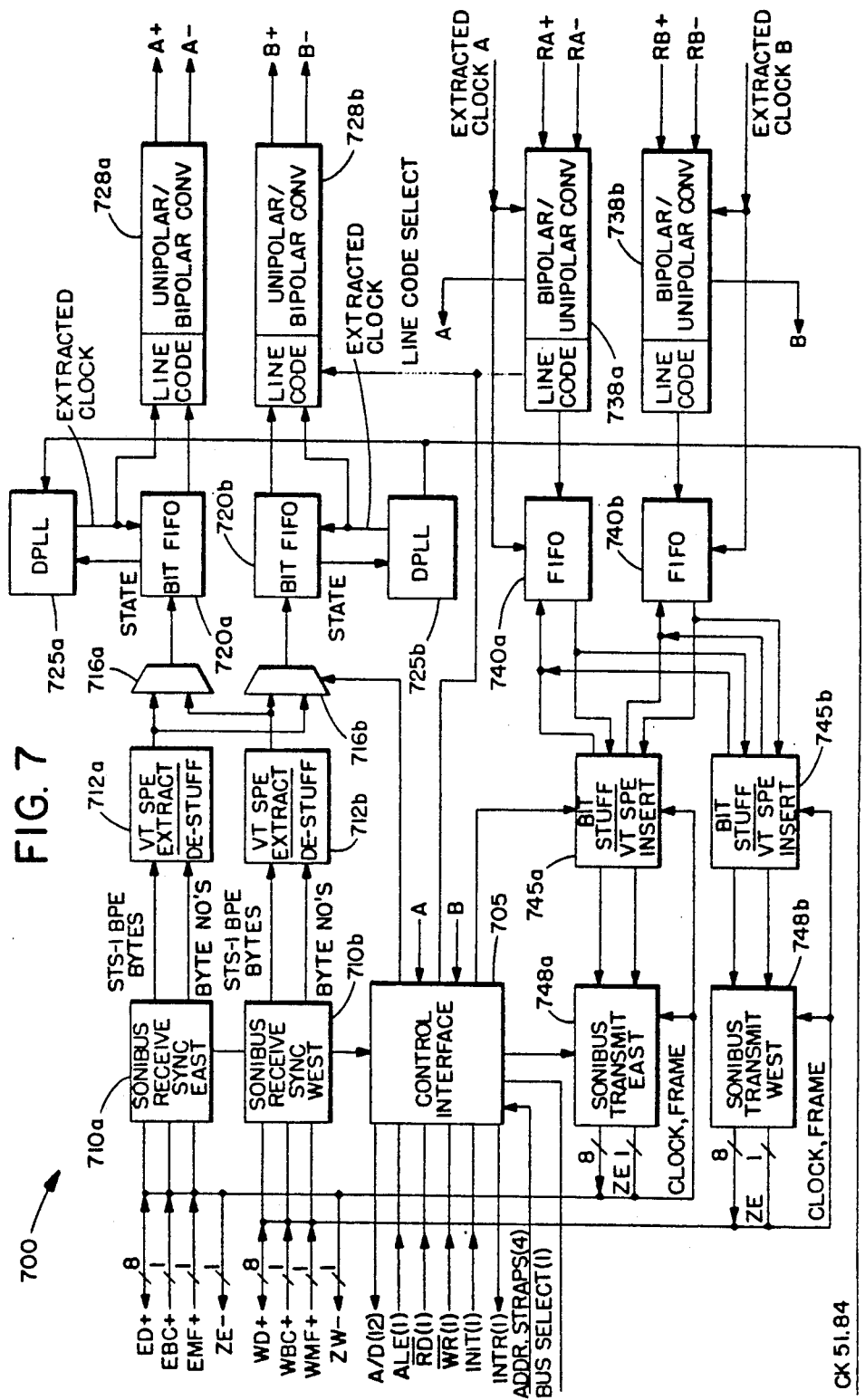
FIG. 7 is a block diagram of the add/drop mux/demux of the invention.

Turning to FIG. 7, a block diagram of a preferred asynchronous add/drop mux 700b is provided which is capable of interfacing to the two STS-1 embodiment of the SONET bus interface. It should be appreciated that, from the teachings associated with FIG. 7, those skilled in the art should be capable of providing additional add/drop multiplexers such as a synchronous add/drop mux 700c, a DS-0 add/drop mux 700a, synchronous and asynchronous CEPTn add/drop multiplexers, etc., and should further be capable of providing add/drop multiplexers which are capable of interfacing with the SONET bus interface 600 shown in FIG. 6.

The asynchronous add/drop mux 700b is capable of logically connecting two selected asynchronous VT1.5 signals of a SONET signal to two external T-1 lines, and whether zero, one or two signals are so-connected is under control of control interface 705. Where a SONET bus interface 600 such as shown in FIG. 6 is utilized, VT1.5 signals may be read from the receive bus (E) 622 and written to the transmit bus (W) 634. However, where the SONET bus interface has the previously described duplicating circuitry, both the east 622 and west 634 buses may be carrying data to be dropped, and either VT1.5 signal may be connected to add or drop in either direction. The VT1.5 signals are received by the receive circuitry 710a and 710b via east and west buses such as bus 622 of FIG. 6 which terminates at the SONET bus interface 600. Receive circuitry 710 also receives associated multiframe and byte clocks (such as clocks 626 and 630) and thus is able to provide a byte count along with the data bytes to the virtual tributary SONET payload envelope extract circuitry 712a and 712b (hereinafter "VT SPE extract"). The VT SPE extract circuitry 712 uses the pointers in the SONET signal to read the relevant transport and path overhead bytes, to discard the negative stuff, and to extract the payloads of the desired virtual tributaries which are then forwarded in bit serial form into either of two FIFOs 720a or 720b via either of two multiplexers 716a or 716b.

Because the virtual tributaries of SONET signals are arranged to encompass a DS-1 signal, the signals received by bit FIFOs 720 are DS-1 signals in content. However, because the DS-1 signals were travelling in SONET format, the clocking of the DS-1 signal is not smooth; i.e. occasional phase steps or gaps are located therein due to pointer movement and the SONET signal structure. Still, the average frequency of the DS-1 signal contained in the virtual tributary may be extracted by digital phase locked loops (DPLL) 725a and 725b each having the data from its asscciated FIFOs 720 as an input. Each DPLL then sends the data from its associated FIFO 720 along with the associated extracted clock to respective line output circuits 728a and 728b so that a non-jittered DS-1 clocked signal may be provided at the average actual DS-1 rate of the outgoing line. The line output circuits 728 encode the received data according to either AMI or B8ZS rules and pass the encoded DS-1 signals to wave shapers (not shown) and then out to the DS-1 (T1) lines.

Turning to the transmit side of the add/drop mux 700, each of the two incoming signals will be received by the line input circuits 738a and 738b on two incoming data lines which are accompanied by clock signals. The line input circuits 738 decode the AMI or B8ZS encoded data signals, monitor and report bipolar violations, and output a DS-1 bit serial stream along with the received clock to twenty-four bits FIFOs 740a and 740b. The FIFOs accommodate the unevenness of the SONET clock relative to a particular DS-1 signal. The bits in the FIFOs are pulled by either of the SONET VT assembly circuits 745a and 745b.

The SONET VT assembly circuits 745 assemble the DS-1 signals into asynchronous mode VT1.5s by appropriately using the data signal from the FIFO 740 and the byte and multiframe clock signals of the bus to which it is associated. These clock signals define the byte, frame, and multiframe boundaries so that all the information required for constructing a proper virtual tributary is available to the VT assembly circuits 745. The resulting VT's are then forwarded to the east or west SONET data buses via the SONIBUS transmit circuits 748a and 748b. The SONIBUS transmit circuits 748 not only couple the assembly circuits 745 to the SONET buses, but, where loop operation is utilized, the SONIBUS transmit circuits 748 cause signals which were dropped at the add/drop mux 700 to be zeroed on the appropriate SONET bus. For example, when a VT signal is dropped from the east bus, the byte positions of that signal needs to be zeroed on the transmit east bus. Hence, the SONIBUS transmit circuit 748 activates the ZE bus line to cause the transmitted signal to be zeroed.

Figure 8A:
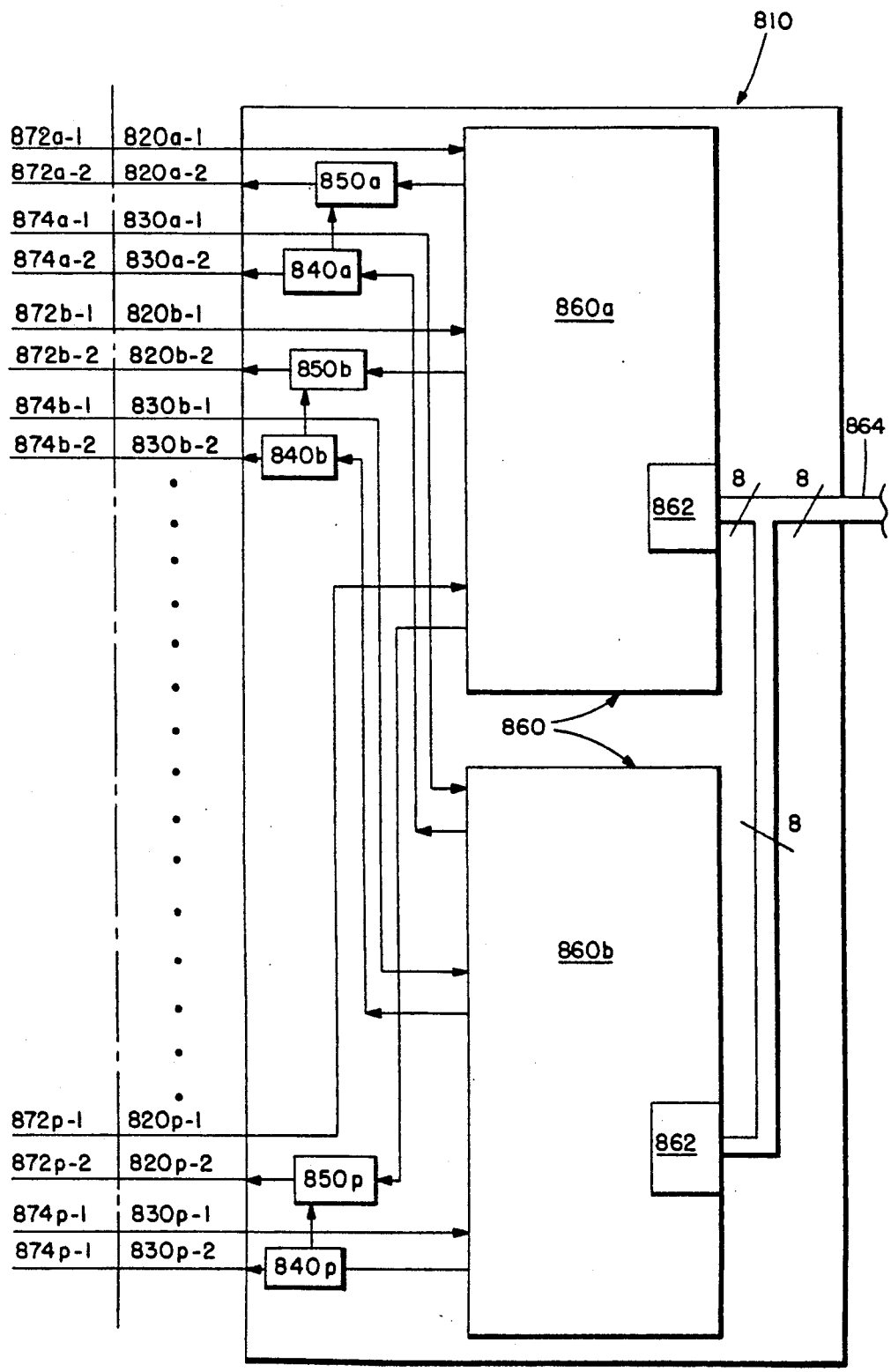
FIG. 8a is a block diagram diagram of the architecture of the basic component of the wide band cross-connect (WBX) switching component of the invention.

Turning to FIG. 8a, a block diagram of the preferred switching component of the WBX switching system module 800 of the invention is seen. The switching component 810 is preferably a CMOS integrated circuit device which includes thirty-two data ports (for sixteen bidirectional lines) 820a-1, 820a-2, 820b-1, 820b-2, ..., 820p-1, 820p-2, thirty-two clock ports 830a-1, 830a-2, 830b-1, 830b-2, ..., 830[−1, 830[−2 (one for each data port), sixteen clock regenerators 840a, 840b, ..., 840p (one for each outgoing or outlet data port), sixteen flip-flops 850a, 850b, ..., 850p (once for each clock generator), and a logical switching matrix 860 for connecting ports in a desired fashion. Each switching component 810 also preferably includes a control interface 862 which controls switching matrix 860 in accord with instruction recived over a control bus 864 from a system controller 20 (seen in FIG. 1).

Inputs into switching component 810 are from control bus 864 as well as from sixteen inlet (input) data lines 872a-1, 872b-1, ..., 872p-1 which carry data, and sixteen inlet clock lines 874a-1, 874b-1, ..., 874p-1 which carry clock signals associated with the data signals. The input data signals are preferably digital signals which were generated after clock recovery, bit decision and decoding of an analog signal, and the associated input clock signals are the clock signals obtained from that clock recovery.

Outputs from switching component 810 are onto sixteen outlet (output) data lines 872a-2, 872b-2, ..., 872p-2 which carry outgoing data, and from sixteen outlet (output) clock lines 874a-2, 874b-2, ..., 874p-2 which carry clock signals associated with the data signals. The output data signals are digital signals which have been appropriately switched, while the output clock signals are clock signals which have been regenerated by the clock regenerators 840.

Figure 8B:
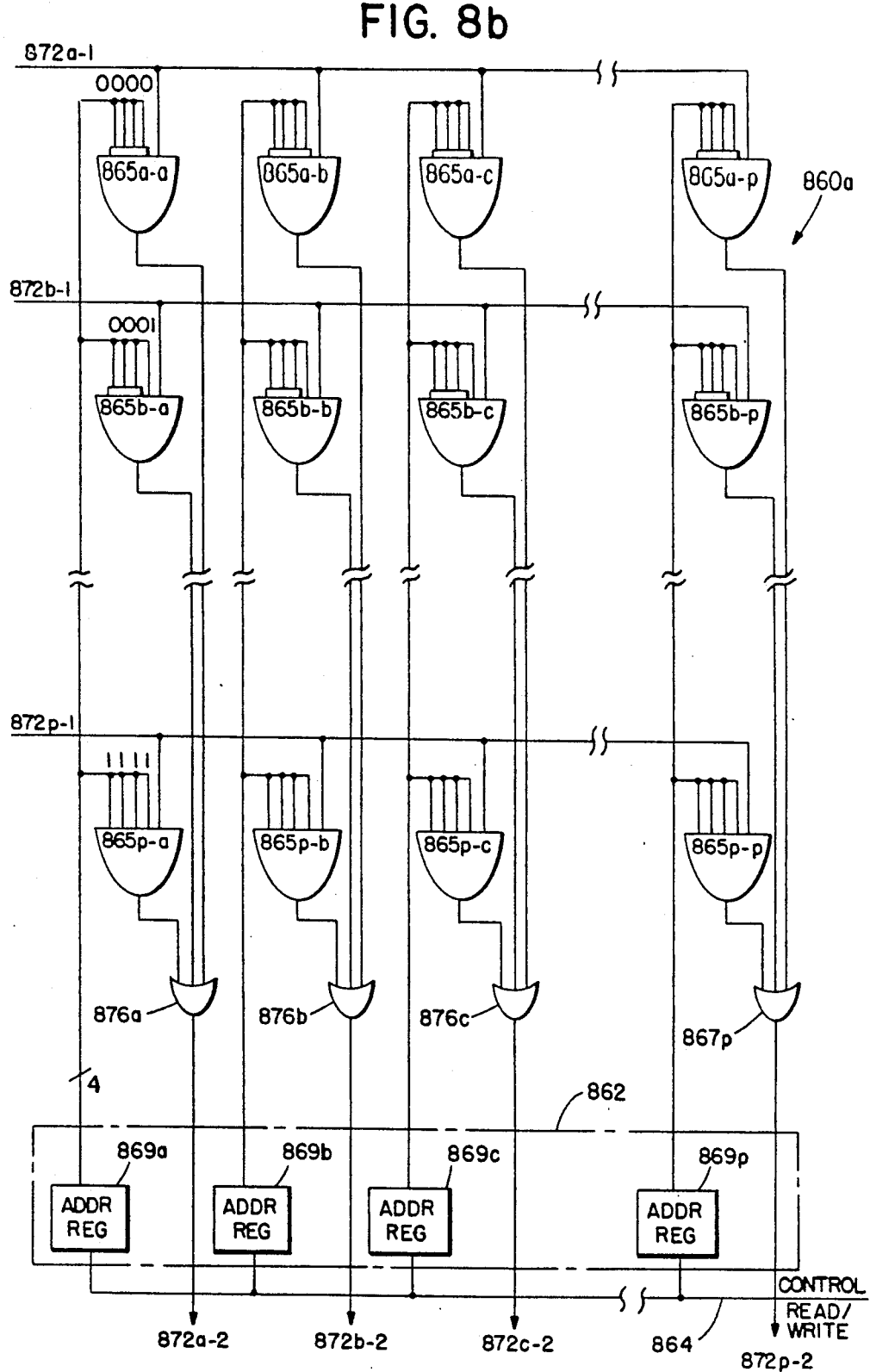
FIG. 8c is a block diagram of an eighty port two stage non-blocking WBX switching network indicative of the utilization of twenty-six basic switching components.

Switching matrix 860 is preferably comprised of duplicate matrices denoted by 860a and 860b; a first matrix 860a utilized for switching data signals, and the second matrix 860b utilized for switching clock signals associated with the data signals. Both matrices 860a and 860b may be comprised according to the teachings of the art. For example, as seen in FIG. 8b, a plurality of AND gates 865a-a, 865a-b, 865a-c ..., 865a-p, 865b-a, 865b-b, ..., 865b-p, ..., 865p-a, ..., 865p-p are used to cross-connect any of the data inlet lines 872a-1, ..., 872p-1, to any of the data outlet lines 872a-2, ..., 872p-2. Whether AND gates 865 permit the data from the data inlet lines through to the outlet lines is under control of the address registers 869a, ..., 869p which comprise the control interface 862. The address registers enable an AND gate by sending a four bit address code simultaneously to the sixteen AND gates in a column. The AND gates are arranged with different input inverters so that a particular code will enable a single AND gate in the matrix column. The data input to the enabled AND gate is passed to the OR gate 867 for that column (OR gates 867 are coupled to all AND gate outputs in a column) an the OR gate passes the data signal from the enabled AND gate to the output.

With the provided switch matrix, a single input signal may be broadcast on all output lines (multicasting) by simultaneously enabling all sixteen AND gates of a single row. A "loopback" may be accomplished by enabling an AND gate along a diagonal of the matrix (e.g. 865a-a or 865b-b, etc.) which causes the signal of an input line to be sent back out over its related output line. Of course, standard cross-sections may be arranged by configuring switch matrix 860a as desired. With sixteen duplex ports, up to eight simultaneous duplex paths may be set up within the switching component 810. Simplex paths may also be established. However, regardless of the manner in which the switch matrix 860a is configured, the clock matrix 860b should be configured identically so that the clock associated with particular data travels with that data through the switching component 810.

As indicated in FIG. 8a, the output of the clock regeneration circuit 840 is seen to the desired clock output port 830-2. In addition, the output of the clock regeneration circuit is fed to the clocking input of a D-type flip-flop 850 which is arranged to receive at its D input the data from data matrix 860a. Thus, the regenerated clock output from the regenerator 840 not only acts as the regenerated clock output for the switching component 810, but also acts to cause the data to be clocked out of the switching component synchronously with its associated clock.

Figure 8C:
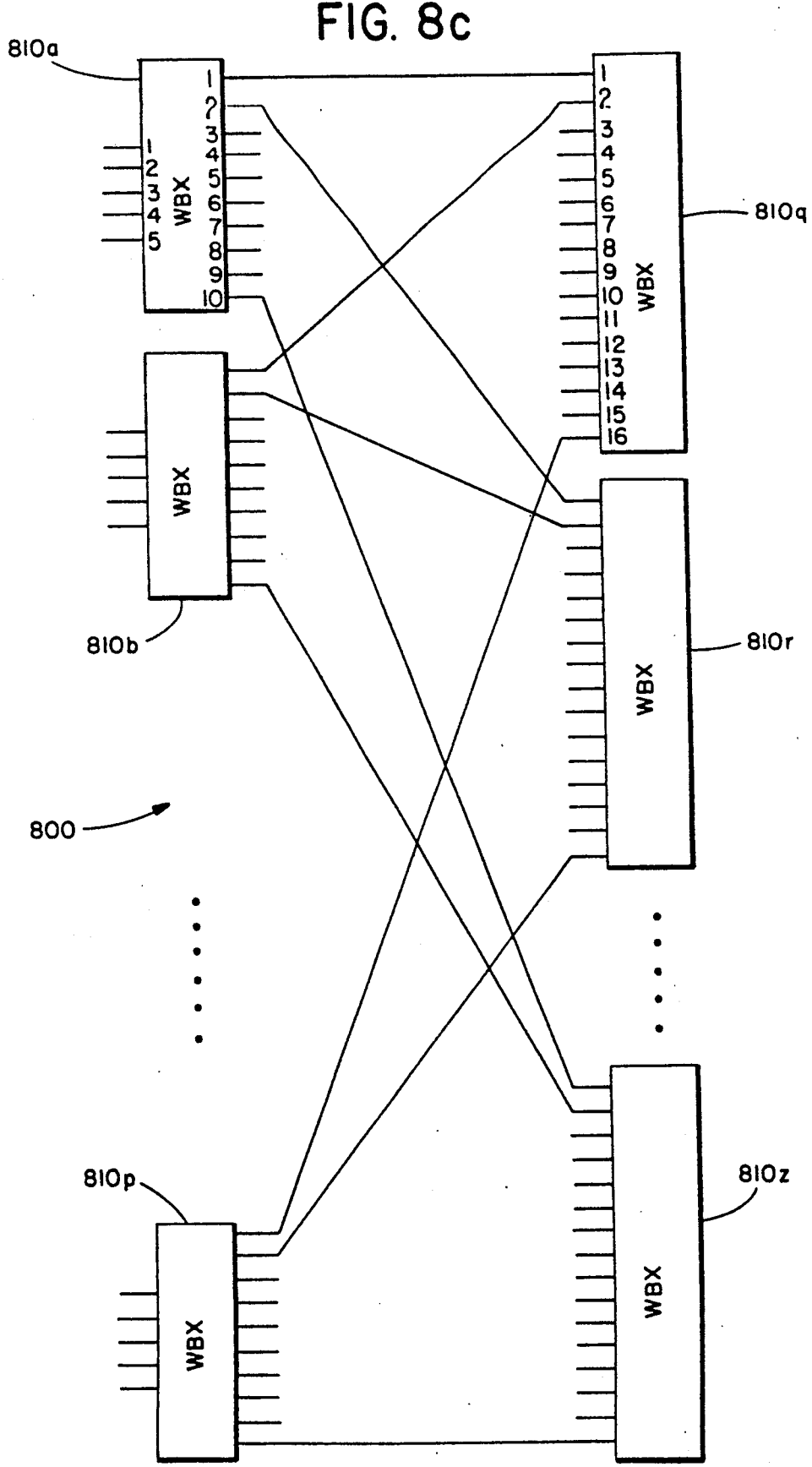

A plurality of the preferred switching components 810 detailed in FIG. 8a may be used to provide a multiple stage non-blocking switching network. For example, a two-stage eighty (four line; data/clock duplex) port folded Clos network 800 utilizing twenty-six switching components 810a–810z is seen in FIG. 8c. As arranged, each switching component of the first stage has five ports acting as input/outputs to the network, and sixteen switching components 810a-810p are required to provide the eighty terminal duplex ports. With five input ports in each switching component, the folded Clos network requires at least nine outputs to the next stage in order to be non-blocking. In fact, ten are typically provided. Thus, fifteen of the sixteen available ports are utilized in each first stage switching component. Also, with sixteen switching components having ten duplex outputs each, the second reflecting stage must provide one hundred sixty duplex ports. With sixteen ports available per switching component, ten additional switching components 810q-810z are utilized to act as the reflecting stage of the folded Clos network. Lines between the various ports of the various switching components as seen in FIG. 8c are indicative of typical paths through the network. Of course, with the provided structure, any of the provided eighty input ports can be connected to any (or all) of the eighty output ports. Also, if properly programmed, eighty different sets of connections each having its own clock and hence its own bit rate maybe arranged wit the provided switching network of FIG. 8c.

While FIG. 8c illustrates an eighty duplex port non-blocking switching network, those skilled in the art will recognize that a network as large as desired may be constructed by utilizing additional stages of WBX components.

Additional details regarding the WBX system module 800 may be had with reference to previously incorporated U.S. Pat. No. 4,914,429.

Figure 9A:
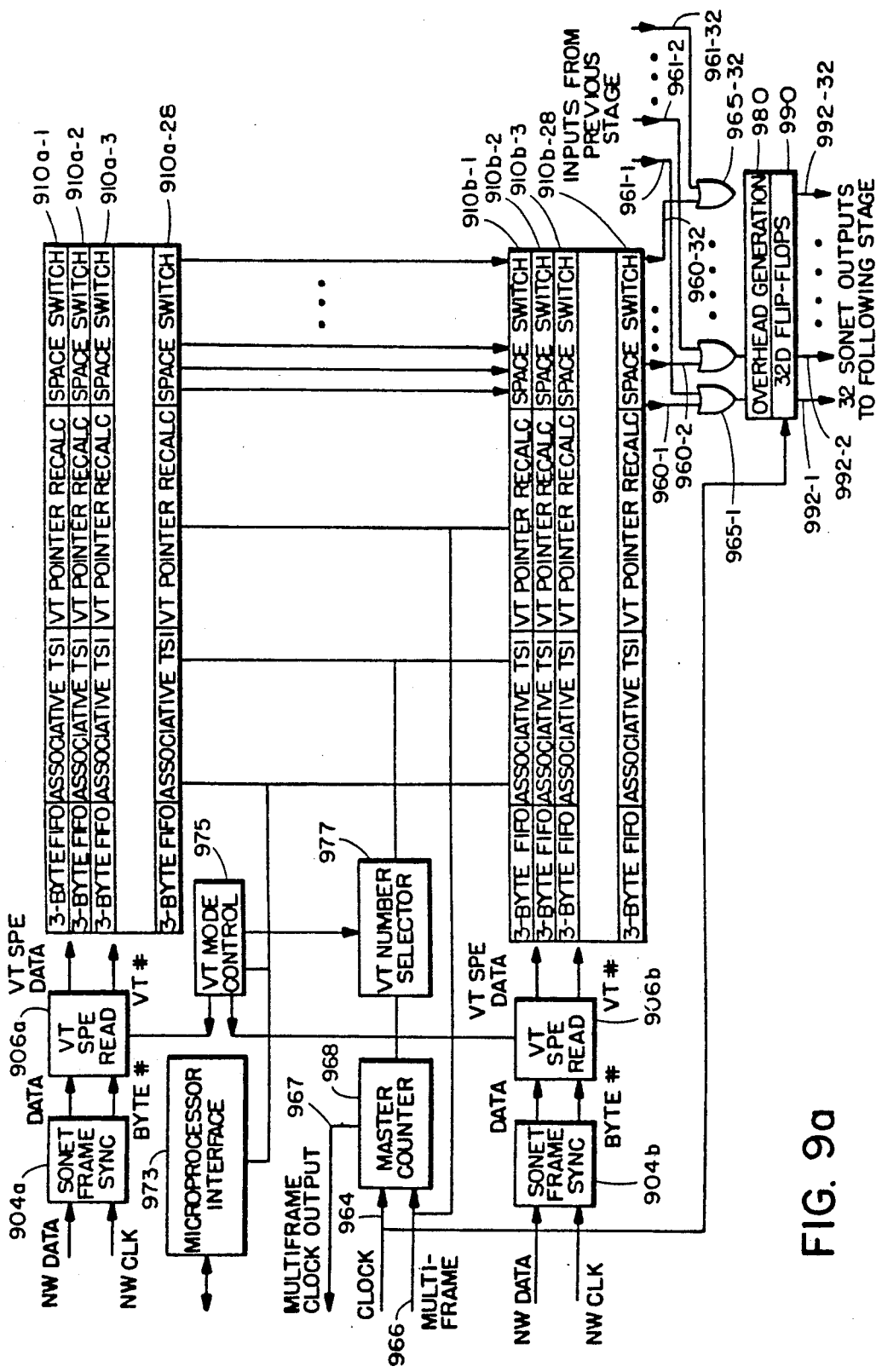
FIG. 9a is a block diagram of the architecture of the basic component of the virtual tributary cross-connect (VTX) switching module of the invention.

Turning to FIG. 9, a block diagram of a single switching component 900-1 of the virtual tributary cross-connect (VTX) module 900 of the system is seen with particular detail to the receiving means of the component. Background information regarding details of a SONET signal, as well as additional detail regarding the VTX system module 900 may be seen previously incorporated patent application Ser. No. 283,178.

In component 900-1, SONET signals are received by SONET frame synchronization circuitry 904a and 904b which find the A1 and A2 bytes of the SONET signals. In this manner, the SONET frames may be deciphered to determine the location of the SPEs within the frame. (From hereon, for purposes of brevity, the circuitry relating to a single SONET signal will be described). The synchronization circuitry 904a outputs the received data along with a byte number which indicates to which byte within the SONET frame the data belongs. The VT SPE read circuitry 906a receives the bytes of data and byte numbers, finds bytes H1 and H2, and locates the start of the SPE within the received signal. With knowledge of the SPE location, the VT SPE read circuitry 906a locates the path overhead, and in particular byte H4, so that a determination of the phase of the virtual tributaries within the SPE (as defined by the H4 byte) may be had. Then, with knowledge of H4, the V1 and V2 bytes of the virtual tributaries are found so that the starting time (i.e. V5 byte location within the payload frame) of each qf the virtual tributary payloads can be found and tagged. The VT SPE read circuitry 906a in a byte serial manner, based on the format of the incoming SONET signal essentially demultiplexes the SONET signal into its component virtual tributaries and forwards the payload (data) of each virtual tributary to its appopriate VT section or slice 910a-1 through 910a-28. In sending the data to its VT slice, the SONET transport overhead, path overhead and VT pointer bytes are discarded, leaving only the VT SPEs. The V5 byte of each virtual tributary payload is tagged, however, as it is sent into the VT section slice 910a-1 through 910a-28 in order to preserve the phase information of the VT payload.

Depending on the format of the incoming SONET signal as known to the VT mode control 975, different numbers of the twenty-eight available VT slices might be utilized for a single SONET signal. Thus, if the SONET signal is comprised of twenty-eight VT1.5 virtual tributaries, all twenty-eight slices 910a-1 through 910a-28 are utilized. However, if some of the virtual tributaries are VT2, VT3, or VT6 virtual tributaries, fewer slices are utilized. Of course, with fewer virtual tributaries, the rates of data flowing into and out of the slices will be greater.

Figure 9B:
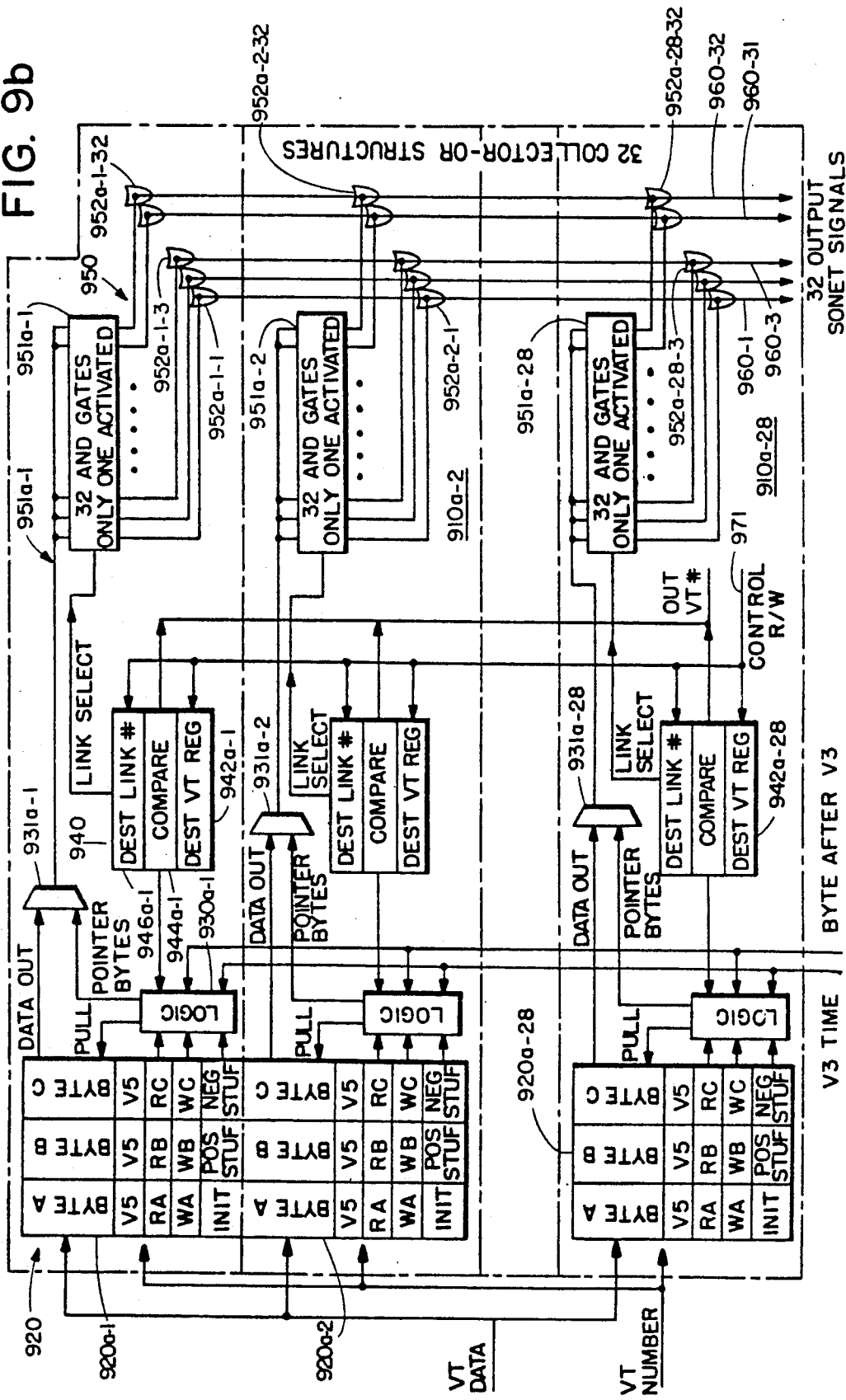

With the virtual tributary data having been demultiplexed out of the SONET frame by the receiving circuitry, the switch component 900-1 must then perform the function of switching the VTs in space and time, and reassemble the VTs into new SONET signals. A block diagram for accomplishing the same is seen in FIG. 9b where three of twenty-eight slices (twenty-eight slices representing one half of component 900-1) are seen in more detail. In essence, each slice 910 may be broken down into four components: buffer means 920 for storing the incoming data on a FIFO basis and for storing the V5 tags; pointer calculation means 930 for determining the phase effect between the incoming virtual tributaries and the SONET signals which are being generated (i.e. for calculating the pointer contained in V1 and V2 so that it will properly point to the position of V5 in the generated SONET signals); read/write means 940 including memory means 942 for storing the virtual tributary destination of the data stored in the buffer, comparison means 944 for comparing the stored virtual tributary destination to a clocked signal indicative of the virtual tributary of the to-be-generated SONET signal requiring data, and memory means 946 for storing the output SONET link destination number for the stored VT; and non-blocking switch matrix means 950 including AND gate means 951a-1 through 951a-28 and OR gate means 952-1 through 952-32 for connecting virtual tributary data contained in any of the buffer means 920 to any of thirty-two data buses 960-1, ..., 960-32 (seen in FIG. 9a) on which the new SONET signals are generated. System inputs into slices 910 include a 51.84 MB/s system bit clock 964 and a 2 kHz multiframe clock 966 which defines for the slices which quarter of the virtual tributary multiframe is located in the particular SONET SPE. Master counter 968 produces an output multiframe clock signal 967 advanced in time by one system bit clock from the input multiframe clock 966, such that the component at the top of an array of n components is n−1 system bit clocks ahead of the component at the bottom of the array. Control information from a processor (not shown) is also input into the slices via processor bus 971 and microprocessor interface 973. The control information is used to set the memory means 942 and 946 of read/write means 940 (seen in FIG. 9b) such that particular incoming virtual tributaries of disassembled SONET signals can be inserted via switch matrix means 950 onto a desired SONET generation bus 960 at a desired time (i.e. corresponding to a desired VT).

Turning back to FIG. 9b, more details of the component 900-1 are seen. In particular, it is seen that the virtual tributary data assigned to slice 910a-1 is received in a buffer 920a-1. Buffer 920a-1, as preferably configured, includes a FIFO register of three eight-bit words which stores the bytes of the VT SPE, three V5 one-bit flags which track the eight-bit words, a set of three one bit "read" flags, a set of three one-bit "write" flags, and three additional flags. The V5 flags are used to indicate whether the byte (eight bit word) contained in a particular register of the FIFO is the V5 byte. The read and write flags are basically recirculating pointers which indicate from where the next word should be read for output onto the SONET generating buses, and to where the next word should be written for storage in the FIFO. Of the three remaining flags, one indicates a positive stuff operation, one indicates a negative stuff operation, and one indicates circuit initialization which is discussed hereinafter.

Figure 5:
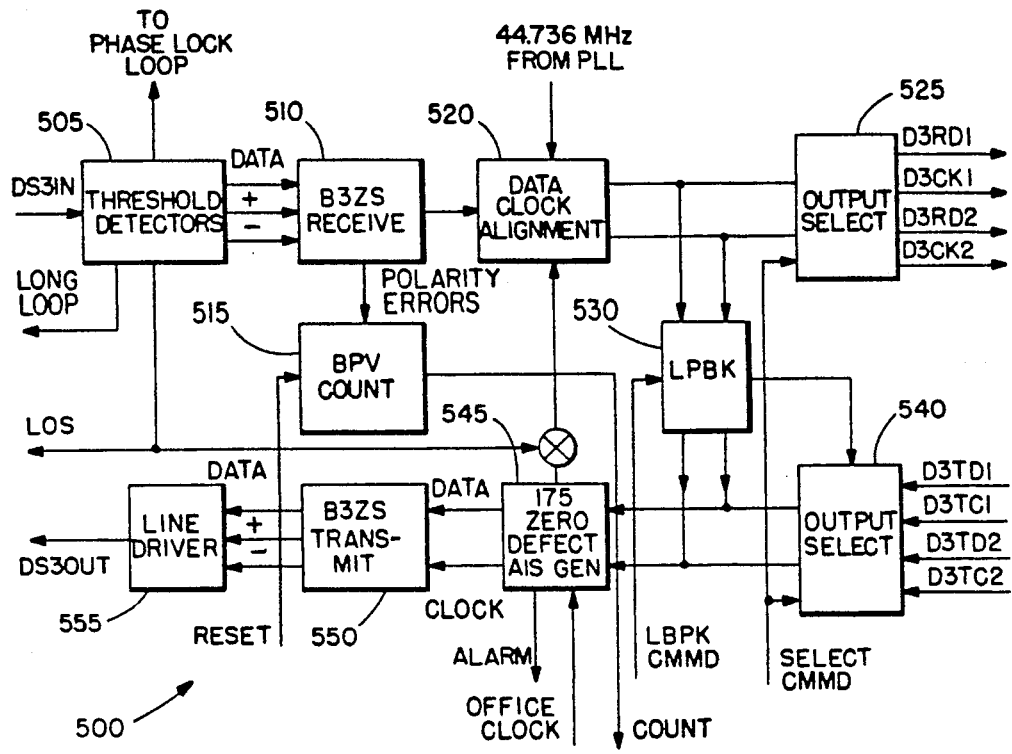
FIG. 5 is a block diagram of the DS3 line interface component of the invention.

Pointer calculation means 910a-1 serves the multiple functions of calculating the pointer for the virtual tributary frame, tracking the positive and negative stuffs and adjusting the virtual tributary frame pointer accordingly, and generating and causing the insertion of the pointer bytes (i.e. V1, V2, etc.) in the VT data stream. In order to properly insert pointer bytes into the VT data stream, the calculation means 930 receives multiframe timing information such that it can determine when VT overhead bytes V1, V2, V3 and V4 are to be inserted into the VT data stream through the use of multiplexer 931a-1. In this regard, it should be noted that the pointer calculation means 930a-1 preferably assumes byte values for the H1 and H2 SONET overhead bytes such that the pointer contained therein has a value equal to five hundred twenty-two. In this manner the SONET signals generated by the component 900-1 has its VT columns aligned with the STS-1 SPE columns (such that each SONET payload is totally contained within a single SONET frame; see FIG. 5).

The virtual tributary pointer calculations conducted by the pointer calculations means 930 are primarily conducted during an initialization procedure which occurs at startup or following a reconfiguration of the system. The purpose of the virtual tributary pointer which is contained in bytes V1 and V2 is to point to the byte V5 which is the first byte in the VT frame. The value contained in the pointer bit locations of bytes V1 and V2 indicates the distance (byte offset) between byte V3 and byte V5 for that virtual tributary. Thus, during initialization (for each VT) a counter is set to zero at the V3 byte location which is located as a result of the virtual tributary frame clock 966. As each byte contained in the buffer is pulled from the buffer onto the SONET generation bus (in a manner to be described hereinafter), the counter is incremented by one. When the byte pulled from the buffer is identified as the V5 byte of the received virtual tributary as indicated by the flag bit tagging the same, the counter value is indicative of the desired pointer value which is then stored. The pointer value is then maintained and used to set bytes V1 and V2 of the succeeding virtual tributary frames. The only time the pointer value is changed is when a positive or negative stuff occurs, such that the pointer value is incremented when a positive stuff is indicated, and the pointer value is decremented when a negative stuff is indicated. in sum, the pointer calculation means 930a-1 is seen to switch a virtual tributary in "phase", as the location of the beginning of the virtual tributary frame in the incoming SONET signal will typically differ from the frame location in the generated SONET signal.

The switching of the virtual tributaries in "time" and "space" is carried out together by the read/write means 940 and the switch matrix means 950. In particular, the read/write means 940a-1 is comprised of three registers: virtual tributary destination register 942a-1, a comparison register 944a-1, and a destination SONET bus number register 946a-1. The virtual tributary destination register 942a-1 stores the virtual tributary number into which the data in the buffers 920a-1 are to be inserted. Because the SONET generation buses are synchronized in time, the occurrence of the virtual tributaries in the SONET frame are distinctly set in time. Thus, as the master counter 968 proceeds, its value may be equated to the sequence of byte times in the overall SONET frame. For a given mix of VT sizes as stored in VT mode control 975, there is an exact mapping between the count of master counter 968 and the virtual tributary timeslot available for data insertion on the SONET generating bus. This mapping is done by VT number selector means 977 which provides a current VT number value to the comparison registers 944. The current VT number value is then compared in comparison registers 944 to the virtual tributary destination register 942 of the read/write means 940. If the match, it is time for the data contained in the buffer to be written onto a SONET generation bus 960. In essence, then, the switching of virtual tributary number one of the received SONET signal whose data is buffered in buffer 920a-1 into a virtual tributary number n of the generated SONET signal constitutes a switching of the virtual tributary in time.

The switching of the virtual tributary in space is accomplished by means of the destination SONET bus number registers 946 of the read/write means in conjunction with a switch matrix 950 which can connect each of the fifty-six (twenty-eight virtual tributaries times two) data buffers 920 of the switch component 900-1 to each of thirty-two SONET generating buses 960. SONET bus destination register 946a-1 is activated upon an output of comparator 944a-1 which causes a byte to be "pulled" from the FIFO 920a-1. The contains of register 946a-1 (which were loaded into the register by the system microprocessor via processor bus 971 and microprocessor interface 973) corresponds to the number of the SONET bus onto which the data from the FIFO is to be switched. Thus, the SONET bus destination register 946-1 acts to control some of the logic circuitry of the switch matrix 950.

Switch matrix 950 of component 900-1 is logically composed of fifty-six sections 951a-1 through 951a-28 and 951b-1 through 951b-28 of thirty-two AND gates each with each AND gate connected to one of thirty-two OR gates 952-1 through 952-32. The contents of register 946-a1 (in a non-broadcasting mode) are used to activate exactly one of the thirty-two AND gates of section 951a-1, thereby permitting a byte from buffer 920a-1 to be inserted in bit-serial form via multiplexer 931a-1 onto one destination bus 960 which comprises the output of one OR gate 952. Thus, at the appropriate time as dictated by comparator 944a-1, data contained in buffer 920a-1 is pulled out of the buffer and written onto the bus 960 dictated by register 946a-1. In essence, then, switch matrix 950 as controlled by the destination bus number register 946 switch the virtual tributaries in space.

The thirty-two outputs 960-1 through 960-32 of the thirty-two OR gate structures 952-1 through 952032 contain all of the space and time switched VTs of the two SONET signals originally received by the component 100. However, in switching networks as will be described with reference to FIG. 9c, these outputs must be combined with the outputs 961-1 through 961-32 of the switch component above it in the switch network. OR gates 965-1 through 965-32 are provided for that reason. The outputs of OR gates 965 are then combined with SONET overhead bytes A1, A2, B1, H1, H2, H3, and H4 which are generated and inserted by overhead generation means 980. The outputs of overhead generation means 980 are reclocked according to the system bit clock 964 by an array of D flip-flops 990 to produce outputs 992-1 through 992-32.

Signals 961-1 through 961-32 from the previous switch component are bit and multiframe synchronous with locally-generated signals 960-1 through 960-32 by virtue of the established one cycle bit clock offset between switch components. Hence, the combination of signals 961 and 960 may be accomplished directly by OR-ing. The outputs of OR gates 965 thus contain all of the VTs arriving on all of the components above the local component in the network as well as those arriving on the local component.

In the overhead generation means 980, the SONET signal framing bytes A1 and A2, the STS-1 pointer bytes H1, H2, and H3, the multiframe indicator byte H4, and the SONET B3 parity check bytes are inserted. To insert them at proper times, the system bit clock 964 and the multiframe clock 966 are provided. The values of A1, A2, and H3 are fixed by design. Likewise. the values of H1, H2, as aforementioned are set to provide a pointer having a value equal to five hundred twenty-two so that the SONET payload is totally contained within a SONET frame. The value of byte H4 is determined by the multiframe signal 966, while the value of B3 is calculated over each of the outputs of OR gates 965-1 through 965-32. In calculating B3, any value received from outputs 965 in the B2 byte position is ignored.

Figure 9C:
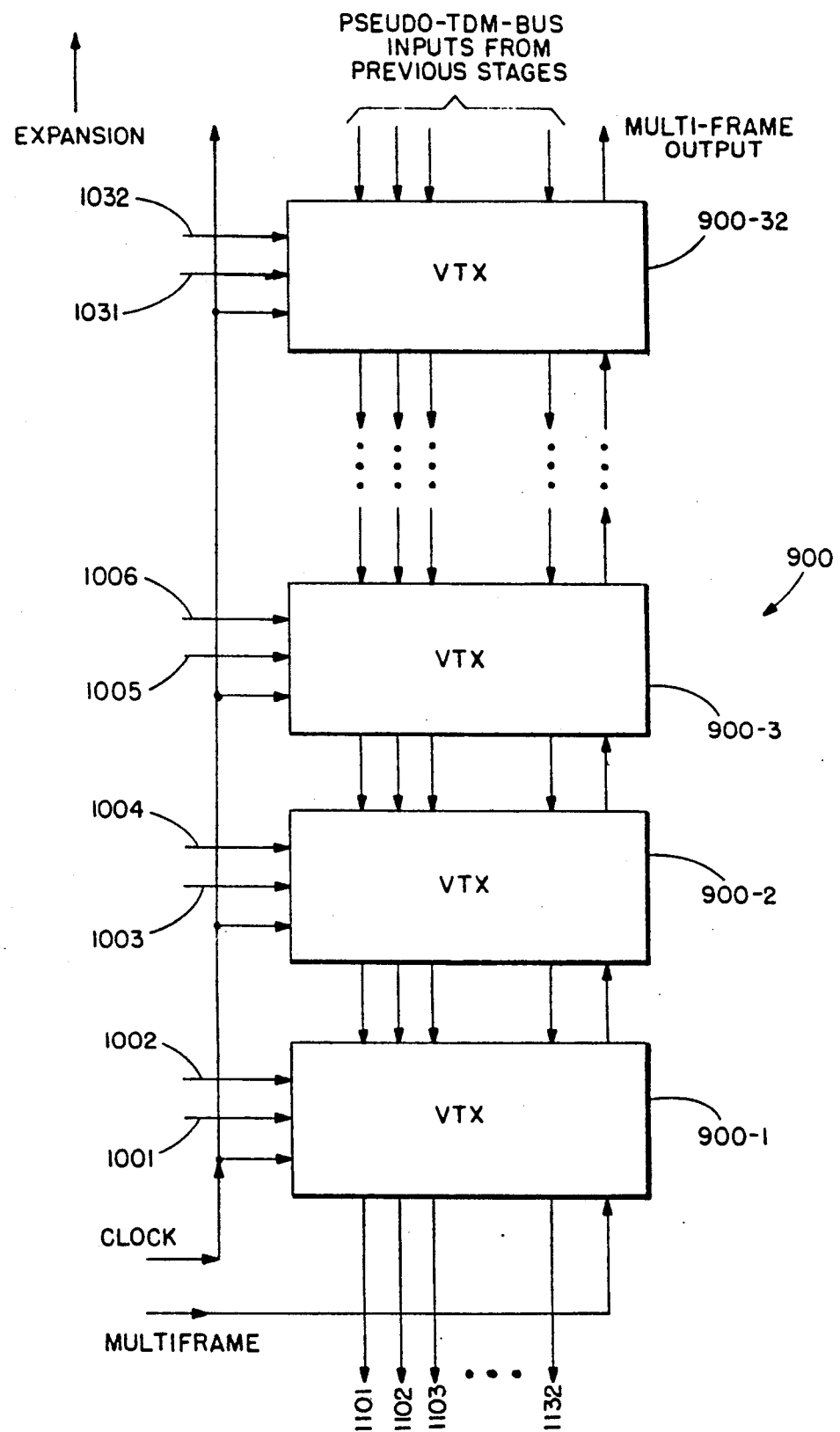
FIG. 9c is a block diagram of a VTX switch network column utilizing a plurality of identical basic virtual tributary cross-connect switching components.

Turning to FIG. 9c, it is seen that a typical switching network 900 may be comprised of sixteen switch components 900-1–900-16. By vertically aligning the sixteen components, up to thirty-two incoming SONET signals 1001 through 1032 can be handled with up to eight hundred and ninety-six virtual tributaries being switched to produce thirty-two new SONET signals 1101 through 1132 which are output on the thirty-two SONET generating buses 992-1, . . . , 992-32. If additional SONET signals are to be processed, the switching network is expanded both vertically and horizontally so that four sets of sixteen switch components are utilized. Vertical expansion permits additional incoming SONET signals to be received, while horizontal expansion provides additional SONET generating buses so that additional SONET output signals can be generated. With sixty-four VTX switch components, the virtual tributaries of up to sixty-four SONET signals may be processed and switched to create sixty-four new SONET signals. It should be appreciated that as large a network as desired may be created.

In order for the switching components and switching network to properly function such that the virtual tributaries may be switched in time, phase, and space, the entire virtual tributary switching network (VTX module 900) is synchronized. Each of the SONET generating buses (thirty-two per component) are in phase with each other and are timed by the system bit clock 964. In addition, as aforementioned, each switching component in a vertical column is arranged to be one system bit clock cycle time advanced from its lower-adjacent component. In particular, the multiframe clock is passed through from the bottom-most component to the top component in the column (as seen by the output of master counter 968 of FIG. 9a) such that in passing the clock, each higher component is advanced in time by one system bit clock cycle relative to the adjacent lower component. As a result, as the generated SONET signal on the SONET generating buses 960 is passed down through a component, it is in time phase with the local signals of that component.

In generating new SONET signals, as aforementioned, the SONET envelope signal (overhead) is preferably generated at the overhead generating means 980 by providing values for framing bytes A1 and A2, multiframe byte H4, and the SONET SPE pointer bytes H1 and H2. At the start of each new SONET frame, the bits of the A1 and A2 framing bytes are serially placed on each bus by means 980. Because each succeeding component is displaced in time, the succeeding components continually overwrite the A1 and A2 information. However, the A1 and A2 information is overwritten (due to OR gates 965) with identical information stored in the overhead generation means of the succeeding components. Hence, proper bytes are generated. After thirty-two clock cycles, the virtual tributary payload is reached, with the master counter indicating that byte one of virtual tributary one should be placed on the respective buses over the next eight clock cycles. Thus, those slices having virtual tributary destination registers equal to a value one pull a byte out of their buffers and in bit serial fashion place that byte on the bus to which the buffer is switched by switch matrix 950 (as indicated by the destination bus number register). At the end of those eight clock cycles, the slices of the component highest in the column could have placed at least one byte on at least one bus, while the slice of the ninth component in the column has not reached its thirty-third clock cycle. For the highest component, the next eight clock cycles would require the placement of byte one of virtual tributary two on respective buses, while for the ninth component in the column, byte one of virtual tributary one is being placed on the buses. The procedure continues for all of the components in such a fashion, with the data effectively being multiplexed onto the SONET generating buses such that the SONET frames get properly generated. In other words, the SONET frames get generated by combining the output signals of the virtual tributaries of the incoming SONET signals onto thirty-two SONET signal generating buses. When a plurality of switch components are utilized, the SONET signal generating buses run vertically through the switch components and are effectively vertically "daisy-chained".

It should be appreciated that with the provided SONET generating arrangement, most of the data used to generate the SONET signal, including the bytes of the VT SPE and the V1-V4 bytes generated by the pointer calculation means 930, are taken from the slices of the switch components. However, overhead information, including SONET framing bytes A1 and A2, SONET SPE payload pointer bytes H1 and H2 (set to a value of five hundred twenty-two), multiframe byte H4, and parity check byte B2 are generated in overhead generation means 980. The multiframe byte value H4 is dictated to the overhead generation means by the multiframe clock 966 which is one system bit cycle removed per component.

Figure 10:
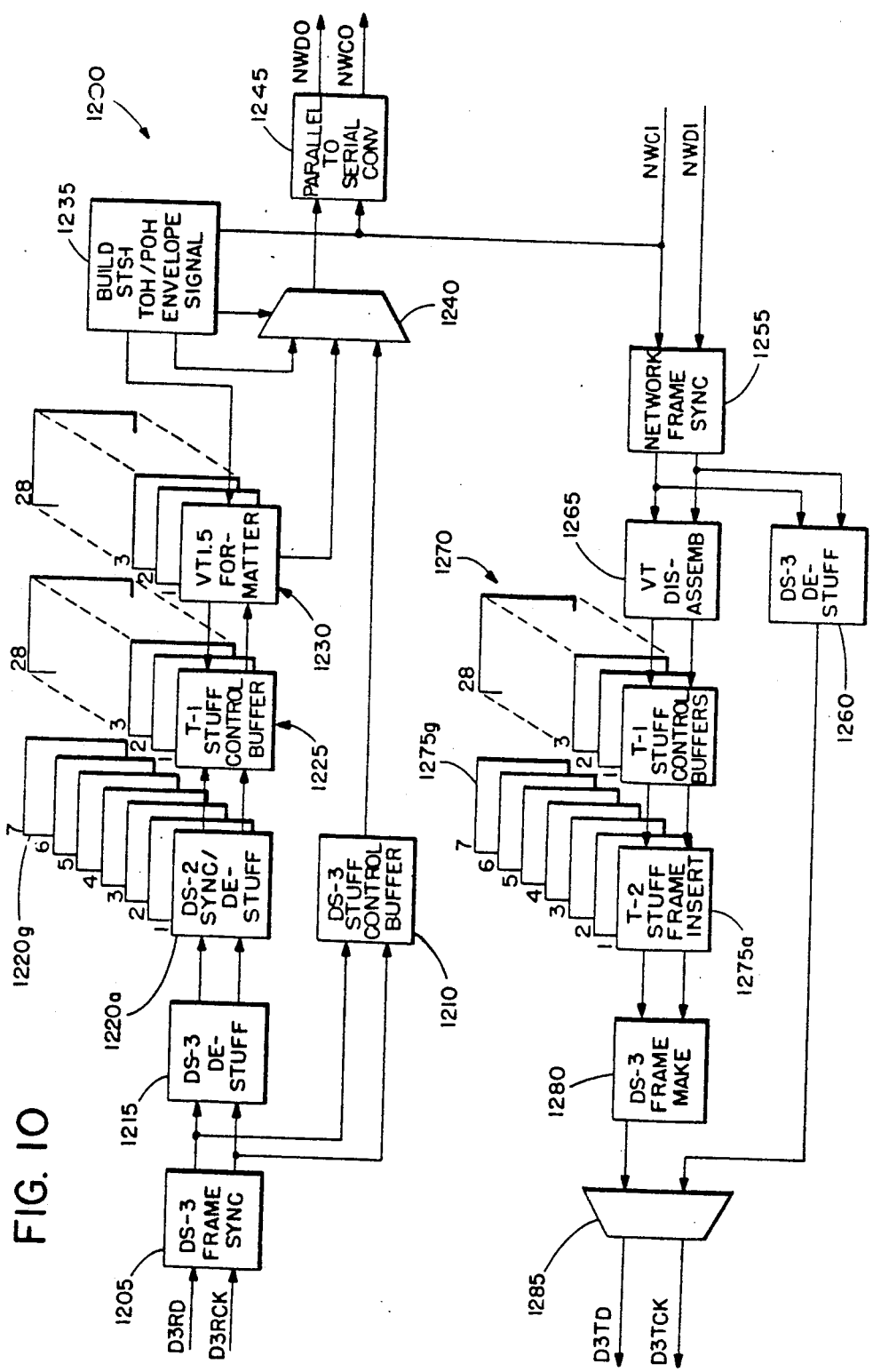
FIG. 10 is a block diagram of the DS3/SONET converter component of the invention.

Turning to FIG. 10, the DS3/SONET converter component 1200 of the invention is seen. The incoming DS-3 signal along with its associated clock is received from the DS-3 line interface circuit 500 by the DS-3 frame sync circuit 1205. The frame sync circuit 1205 searches for and locks to the DS-3 frame and multiframe patterns as well as conducting an AIS signal detection along with a loss of signal detection. In synchronizing with the DS-3 frame, the sync circuit 1205 searches for a column of data value ones corresponding to either column of "F1" bits in the DS-3 format. Having found the F1 column, the circuitry resolves which of the two F1 columns is received by looking at two bits of column zero of two subframes later. Finally, frame position is resolved to recover bits M0, M1, M0 and complete the synchronization process. If synchronization is not established within a predefined time, an alarm is raised. Also, parity is counted over 4704 time slots following the first X-bit in an M-frame and is compared with the received PP bits. If the parity count does not correspond to the appropriate PP value, a parity error counter is indexed.

Depending on the mode in which the DS3/SONET converter 1200 is to be used, the incoming data is either forwarded to the DS-3 stuff control buffer 1210, or to the DS-3 destuff circuit 1215. In the former case, the entire DS-3 is stuffed into a SONET signal frame (although only bytes A1, A2, H1 and H2 need be identified; hence the signal is not in "substantial SONET format"), while in the latter case, the twenty-eight DS-1 components of the DS3 signal are each individually stuffed into VT1.5's. If the data is forwarded to DS-3 stuff control buffer 1210 (which is basically a FIFO), the entire DS-3 signal is presented to the FIFO at the DS-3 receive line bit rate and is read out in bursts at the STS-1 51.84 Mb/s rate. Five stuff control bits are provided at column, bit positions C4-B5, C32-B7, C32-B6, C61-B7, and C61-B6. Majority voting determines whether the bit in column sixty-one, bit zero is a stuff or information bit. If during the readout of column eighty-seven, bit zero, the number of bits in the FIFO is fewer than a first predetermined value, the stuff control bits of the next row are marked to "11111" and a zero is placed column eighty-seven, bit zero. If the number of bits in the FIFO is greater than a second predetermined value, the stuff control bits of the next row are marked "00000", and an information bit is placed in column eighty-seven, bit zero, The so-generated STS-1 signal is then forwarded via multiplexer 1240 to parallel to serial converter 1245 as will be described hereinafter.

Where the incoming DS-3 signal is to broken into its DS-1 components for stuffing into virtual tributaries, the data from frame sync circuitry 1205 is sent to DS-3 destuffer 1215 which monitors for and appropriately treats loss of signal, loss of lock, and for an alarm indication signal. In normal operation, the DS-3 destuffer forms seven T-2 outputs with associated clocks from the DS-3 signal by taking bytes I1-I7 sequentially from the network synchronized DS-3 bit stream and by appropriately deleting stuff bits. The clock and T-2 data outputs are then sent to the seven identical DS-2 synchronization and destuffing blocks 1220a-1220b. Each DS-2 sync and destuffing block provides synchronization to the seven DS-2 signals and extracts the twenty-eight DS-1 signal which are to formed into VTs. Synchronization is obtained by searching for the . . . 01010101 . . . framing pattern. Once the framing pattern is located, one more frame time is needed to acquire the multiframe time. With synchronization established, each DS-2 signal is destuffed where appropriate to generate four resulting DS-1 signals. For example, if two or three Cxy bits of the DS0-2 subframe x are value ones, the bit Ix of the sixth group of forty-nine bits of that subframe is a stuff bit for DS-1 number x. If the bit is a stuff bit, it is discarded by the DS-2 sync destuff block 1220. If it is not a stuff bit, it is data, and is passed on to an appropriate T-1 stuff control buffer 1225 which receives the DS-1 data and an uneven clock.

The twenty-eight T-1 stuff control buffers 1225 are essentially independent FIFOs which assist in a frequency justification of the DS-1 signals into the VT1.5s. Eight bits for insertion into each of bytes four through twenty-seven of a SONET virtual tributary, as well as one bit plus stuff control information for insertion into byte number three must be pulled by each VT1.5 formatter 1230 from each T-1 stuff control buffer 1225. Then, under control of the STS-1 TOH/POH envelope build block 1235 (which inserts transport and path overhead bytes into the data stream as required as discussed below), the data is forwarded via mux 1240 to the parallel to serial converter 1245. Parallel to serial converter 1245 converts the byte parallel data received from the VT1.5 formatter 1230, the STS-1 TOH/POH envelope build block 1235, or from the DS-3 stuff control buffer 1210 into a bit serial substantially SONET formatted signal with an associated bit clock.

In order to build a substantially SONET formatted signal from the twenty-eight VT1.5 signals, the STS-1 TOH/POH envelope block 1235 utilizes a 51.84 Mb/s clock. Since the transport mode of the signal to be generated is asynchronous, the phase of the locally-generated substantially SONET formatted signal is arbitrary and does not need to be synchronized with the frame of any other signal. Thus, the simplest signal possible, with a fixed phase relationship between the STS-1 frame phase and the STS-1 SPE phase may be generated. Thus, a fixed value for the SPE offset pointer is provided, and the only necessary values inserted into the TOH bytes are the framing bytes A1, A2, the fixed pointer, and the network loss of sync byte inserted in the position normally used for BIP-8 B1. All other TOH bytes are set to zero. In the path overhead, the BIP-8 B3 byte is inserted along with a locally-generated H4 multiframe byte. Bytes V1, V2, V3, and V4 are inserted with fixed pointer values as the VT SPEs are inserted in fixed positions in the STS-1 SPE. The overhead bytes are inserted as required into the data stream via multiplexer 1240 as previously described.

The transmit side of the DS3/SONET converter 1200 essentially conducts the reverse of the operation conducted by the receive side. A substantially SONET formatted signal (or a signal having a SONET frame and carrying a bulk DS-3 signal) is received by network frame sync block 1255 which searches for and locks to the frame pattern of the incoming signal. The network frame sync block 1255 checks for parity errors, loss of lock, and loss of signal, and outputs bytes of data along with a synchronized byte clock and byte number indication (as well as any necessary alarm if signal or lock are lost). The bytes and clocks are output to either the DS-3 destuff block 1260 or the VT disassemble block 1265 based on the mode of the DS3/SONET converter 1200. Where the DS-3 destuff block 1260 is utilized, the DS-3 signal bits are extracted from the SONET signal by the DS-3 destuff block 1260, and a phase locked loop is utilized to recover the average DS-3 line frequency. The DS-3 signal and clock are then forwarded via multiplexer 1285 to the DS3 line interface module 500.

Where the VT disassemble block 1265 is utilized, the substantially SONET formatted signal is stripped by the disassemble block 1265 of the transport and path overhead, and the VT SPE is extracted from each asynchronous floating mode VT1.5 using the VT pointers of bytes V1, V2 and V3. Then, deleting the fixed stuff and stuff control bits, the remaining data bits are sent along with their clocks to the twenty-eight T-1 stuff control buffers 1270. The T-1 stuff control buffers take the twenty-eight independent DS-1 signals, and provide therefrom seven DS-2 signals with the DS-1 signals stuffed into defined positions in the DS-2 signals. The synchronized DS-2 signals are then forwarded to the T-2 stuff frame insert block 1275 where the DS-2 signal frame, multiframe, stuff, stuff control bits, and inversion bits are all inserted. The seven synchronous DS-2 signals are then forwarded to the DS-3 frame builder 1280 which properly inserts the DS-2 signals into the DS-3 signal along with desired overhead. The properly assembled DS-3 signal is then passed via multiplexer 1285 to the DS3 line interface module 500.

Returning to FIG. 1, and with the above-described modules of system 10, it should be appreciated that a plethora of desired systems utilizing subsets of the modules of the system can be arranged. For example, using just a DS-3 line interface module 500, a DS-3/SONET converter 1200, and the SONET Path Terminator 400, A DS-3 line signal can be stuffed into a SONET STS-1 line signal and be sent out over an STS-1 line. Likewise, an incoming SONET STS-1 signal can be converted into DS-3 format and sent out over a DS-3 line.

By adding the WBX 800, and additional SPT modules 400, DS-3 line interface modules 500 and DS-3/SONET converter modules 1200, to modules 400, 500, and 1200, more complex systems can be realized. Cross-connects of various DS-3 signals, and cross-connects between various SONET STS-1 signals can be accomplished. In addition, cross-connects between any of various SONET STS-1 signals and the various DS-3 signals can be carried out.

Provision of the "back end" components in addition to modules 400, 500, 800, and 1200 adds another dimension to the system. With the addition of add/drop mux 700b and preferably the SONET bus interface 600, particular DS-1 signals may be placed into VTs of a substantially SONET formatted signal and switched as part of the substantially SONET formatted signal to the SPT 400. Or, the DS-1 signals may be sent to the DS-3/SONET converter to comprise part of a DS-3 signal which is sent out to a DS-3 line via the DS-3 line interface 500. Of course, these tasks can be accomplished without the WBX 800 if complex switching for numerous STS-1 and/or DS-3 lines is not required. Similarly, if synchronous signals are being processed, different add/drop multiplexers such as 700a and/or 700c could be similarly utilized. Moreover, add/drop multiplexers 700d interfacing to CEPTn lines could be included such that a CEPT signal could be switched to comprise part of a SONET STSn or DS-3 signal.

The use of the VTX 900 adds yet another level of complexity to any system. With the VTX, and channel of any incoming signal can get cross-connected to any channel of any outgoing signal, provided of course that the signals are first placed into substantially SONET format such as by the add/drop multiplexers 700 or the DS-3SONET converter 1200; the STS-1 signals already being in such a format. Thus, for example, the twenty-eight virtual tributaries of a particular incoming SONET STS-1 signal obtained from an STSn line could be switched into up to twenty-eight different substantially SONET formatted outgoing signals, with one or more virtual tributaries being converted into DS-1 channels of one or more DS-3 signals (via components 1200 and 500), one or more VTs being included as VTs in one or more STSn signal (via components 400, and components 300, 200 and 100 if desired), and one or more VTs being included as VTs in one or more STS-1 signals where particular VTs are dropped at one or more asynhronous add/drop multiplexers such as 700b.

Of course, the DS-3/SONET converter 1200 and DS-3 line interface 500 are not necessary in many other systems. Thus, using only a plurality of SPTs 400 and the WBX 800 and/or VTX 900, cross-connection of SONET signals may be accomplished. If the VTX 900 is utilized, VTs within the SONET signals may be cross-connected. Also, if it is desired to add and drop virtual tributaries, back end components 600 and 700 may be added to such a system. In fact, because the back end components build substantially SONET formatted signals, a combination of components 700, 600, and 400 (and 300, 200 and 100, if desired) without the VTX 900 and WBX 800 would be very useful. Of course, as aforedescribed, the addition of the VTX 900 and/or the WBX 800 permits the system to accomplish many additional powerful functions.

Further, it will be recognized that the SONET front end components (100, 200, 300 and 400) as well as the DS-3 related components (500 and 1200) need not be utilized, and still a useful system can be obtained. In particular, the combination of the add/drop multiplexers 700 with the VTX 900 and/or the WBX can provide desirable results. In particular, cross-connecting of particular add/drop multiplexers can be accomplished thereby.

There has been described and illustrated herein a modular, non-blocking, expandable SONET compatible cross-connect system capable of interfacing with and cross-connecting STSn, DSn and CEPTn signals. While particular embodiments have been described, it is not intended to be limited thereto as it is intended that the invention be as broad in scope as the art will allow. Thus, it should be appreciated that different circuitry than that disclosed could be utilized in all of the modular components, provided the format of the data internal the system is of substantially SONET format. For example, certain components process the data in byte-parallel format, while other components utilize the bit-serial format. In particular, the add/drop multiplexers are seen to convert data into byte-parallel format for transport over a bus and to the SONET bus interface. Of course, if desired, the SONET bus interface could be deleted if the data were transported on a bit serial bus as opposed to a byte parallel bus, and if the add/drop multiplexers could receive and transmit in such a fashion. Further, while the particular numbers of ports were described for the chip components of the VTX and WBX cross-connect modules, it will be appreciated that different numbers of ports could be utilized per chip. The arrangement of the non-blocking cross-connect networks could also be changed, as the WBX need not necessarily be of a folded Clos architecture, while the VTX need not be of a bus architecture. While both those architectures are preferred, as they are expandable, it is only required that the networks be non-blocking.

It should further be appreciated that while all connections and internal timing of the system was described as being at an STS-1 level, other STSn timings could be utilized, such as STS-3. Moreover, while a particular arrangement of system modules was provided in the Figures, different arrangements can be provided due to the mix and match nature of the modules. Finally, it will be appreciated that terminology in the claims is intended to be read in a broad light, such that terms such as "coupled to" do not suggest direct connection, Therefore, it will be apparent to those skilled in the art that yet other modifications may be made to the invention as described without departing from the spirit and scope of the claimed invention.

We claim:

1. A modular, expandable cross-connect system for high speed digital signals, comprising:
   (a) receiving means for receiving at least one signal formatted in other than a substantially SONET format;
   (b) converting means coupled to said receiving means for converting into a substantially SONET formatted signal said at least one signal received by said receiving means; and
   (c) cross-connection means coupled to said converting means for cross-connecting said substantially SONET formatted signal.

2. A system according to claim 1, wherein:
said converting means comprises means for receiving one of a DSn and CEPTn formatted signal, means for converting said one of a DSn and CEPTn signal into at least a part of a virtual tributary format signal, and means for placing said at least a part of a virtual tributary format signal in an appropriate time frame on a substantially SONET formatted bus such that said at least a part of a virtual tributary format signal is part of a substantially SONET formatted signal.

3. A system according to claim 2, wherein:
said cross-connection means comprises at least a virtual tributary cross-connection means, said virtual tributary cross-connection means comprising,
SONET signal receiving means for receiving a plurality of substantially SONET formatted signals, including means for disassembling said substantially SONET formatted signals into virtual tributary payloads of tracked phase, and
means for cross-connecting said virtual tributary payloads in space, time, and phase to generate new substantially SONET formatted signals.

4. A system according to claim 3, further comprising:
   (d) transmitting means coupled to said virtual tributary cross-connection means and coupled to one of DSn, CEPTn, and STSn compatible transmission lines for transmitting a cross-connected substantially SONET formatted signal over one of said DSn, CEPTn, and STSn compatible transmission lines.

5. A system according to claim 4, wherein:
said transmitting means is coupled to an STS-1 line and comprises a SONET path terminating means coupled to said virtual tributary cross-connection means for receiving a substantially SONET formatted signal, for creating a bit serial SONET formatted signal output therefrom by inserting at least path and transport overhead information in said substantially SONET signal, and for providing line interface functions to permit said bit serial SONET formatted signal to be transmitted on said STS-1 line.

6. A system according to claim 4, wherein:
said transmitting means is coupled to an STSn line, where n is greater than one, and said transmitting means comprises
a SONET path terminating means coupled to said virtual tributary cross-connection means for receiving a substantially SONET formatted signal, for creating a SONET formatted signal therefrom by inserting at least path and transport overhead information in said substantially SONET signal, and
a multiplexer means for receiving and multiplexing at least two of said SONET signals from a plurality of said SONET path terminating means to create a bit serial STSn formatted output signal where n is greater than one, and for providing line interface functions to permit said bit serial STSn formatted signal to be transmitted on said STSn line.

7. A system according to claim 4, wherein:
said transmitting means is coupled to an STSn line, where n is greater than three, and said transmitting means comprises
a SONET path terminating means coupled to said virtual tributary cross-connection means for receiving a substantially SONET formatted signal, for creating a SONET formatted signal therefrom by inserting at least path and transport overhead information in said substantially SONET signal,
a first multiplexer means for receiving and multiplexing at least three of said SONET signals from a plurality of said SONET path terminating means to create a first STSn formatted signal where n is greater than one,
a second multiplexer means for receiving, multiplexing, and scrambling a plurality of said first STSn formatted signals to create a second STSn formatted signal where n is greater than three, and
a line interface means for receiving said second STSn formatted signal, for providing a second bit serial STSn formatted signal therefrom, where n is greater than three, and for interfacing said second STSn formatted signal to said STSn line of same bit rate.

8. A system according to claim 4, wherein:
said transmitting means is coupled to one of said DSn and CEPTn compatible transmission lines, and comprises means for extracting at least one virtual tributary, from a substantially SONET formatted signal, and second converting means for converting said at least one virtual tributary into one of a DSn and CEPTn format for transmitttal over said one of DSn and CEPTn compatible transmission lines.

9. A system according to claim 8, wherein:
said transmitting means is coupled to a DS-3 compatible transmission line, said means for extracting extracts twenty-eight virtual tributaries from said substantially SONET formatted signal, said second converting means comprises means for stuffing said twenty-eight virtual tributaries into twenty-eight DS-1 formatted signals and means for building a substantially DS-3 formatted signals from said twenty-eight DS-1 formatted signals.

10. A system according to claim 8, wherein:
said transmitting means is coupled to an asynchronous DS-1 compatible transmission line, and said second means for converting converts each extracted virtual tributary into an asynchronous DS-1 compatible signal at a like rate to a DS-1 compatible transmission line to which it is coupled.

11. A system according to claim 8, wherein:
said transmission means is coupled to a synchronous DS-1 compatible transmission line, and said second means for converting converts each extracted virtual tributary into a synchronous DS-1 compatible signal at a like rate to a DS-1 compatible transmission line to which it is coupled.

12. A system according to claim 8, wherein:
said transmitting means is coupled to an asynchronous CEPTn compatible transmission line, and said second means for converting converts each extracted virtual tributary into an asynchronous CEPTn compatible signal at a like rate to a CEPTn compatible transmission line to which it is coupled.

13. A system according to claim 8, wherein:
said transmitting means is coupled to a synchronous CEPTn compatible transmission line, and said second means for converting converts each extracted virtual tributary into a synchronous CEPTn compatible signal at a like rate to a CEPTn compatible transmission line to which it is coupled.

14. A system according to claim 11, wherein:
said means for receiving one of a DSn and CEPTn formatted signal comprises means for receiving a synchronous DS-1 formatted signal, said means for converting comprises means for converting said synchronous DS-1 formatted signal into a virtual tributary format signal.

15. A system according to claim 4, wherein:
at least a portion of said substantially SONET formatted signal is synchronous, and
said transmitting means is coupled to a DS-0 compatible interface and comprises means for extracting at least a predefined part of a virtual tributary of said synchronous substantially SONET formatted signal, and second converting means for converting said predefined part of said virtual tributary into a DS-0 format for transmittal over said DS-0 interface.

16. A system according to claim 15, wherein:
said means for receiving comprises means for receiving a synchronous DS-0 formatted signal, said means for converting comprises means for converting said synchronous DS-0 formatted signal into said portion of a virtual tributary format signal.

17. A system according to claim 11, wherein:
said means for receiving comprises means for receiving a synchronous DS-0 formatted signal, said means for converting comprises means for converting said synchronous DS-0 formatted signal into a part of a virtual tributary format signal.

18. A system according to claim 4, further comprising:
(e) said substantially SONET formatted bus coupled to said transmitting means, wherein said substantially SONET formatted bus transports said substantially formatted SONET signal in byte-parallel fashion in conjunction with at least an associated clock, and said converting means includes serial-parallel data conversion means for receiving data in a serial format and providing a parallel format representation thereof.

19. A system according to claim 18, further comprising:
non-blocking wide band cross-connecting means including a plurality of data ports and a plurality of associated clock ports, and means for cross-connecting at least said substantially SONET formatted signals received at a first data port along with an associated clock signal received at an associated clock port to respective any of said plurality of data ports and associated clock ports, wherein at least a first group of said plurality of data ports and associated clock ports are coupled to said receiving means, and at least a second group of said plurality of data ports and associated clock ports are coupled to said transmitting means.

20. A system according to claim 2, wherein:
said cross-connection means comprises at least said substantially SONET formatted bus coupled to said means for placing said converting means, wherein said substantially SONET formatted bus transports said substantially formatted SONET signal in byte-parallel fashion in conjunction with at least an associated clock, and said converting means includes serial-parallel data conversion means for receiving data in a serial format and providing a parallel format representation thereof.

21. A system according to claim 20, further comprising:
(d) transmitting means coupled to said substantially SONET formatted bus, and further coupled to one of a DSn, CEPTn and STSn compatible transmission lines for transmitting a cross-connected substantially SONET formatted signal over one of said DSn, CEPTn, and STSn compatible transmission lines.

22. A system according to claim 21, wherein:
said transmitting means is coupled to an STS-1 line and comprises a SONET path terminating means coupled to said substantially SONET formatted bus for receiving a substantially SONET formatted signal, for creating a bit serial SONET formatted signal output therefrom by inserting at least path and transport overhead information in said substantially SONET signal, and for providing line interface functions to permit said bit serial SONET formatted signal to be transmitted on said STS-1 line.

23. A system according to claim 21, wherein:
said transmitting means is coupled to an STSn line, where n is greater than one, and said transmitting means comprises
a SONET path terminating means coupled to said substantially SONET formatted bus for receiving a substantially SONET formatted signal, for creating a SONET formatted signal therefrom by inserting at least path and transport overhead information in said substantially SONET signal, and
a multiplexer means for receiving and multiplexing at least two of said SONET signals from a plurality of said SONET path terminating means to create a bit serial STSn formatted output signal where n is greater than one, and for providing line interface functions to permit said bit serial STSn formatted signal to be transmitted on said STSn line.

24. A system according to claim 21, wherein:

said transmitting means is coupled to an STSn like, where n is greater than three, and said transmitting means comprises a SONET path terminating means coupled to said substantially SONET formatted bus for receiving a substantially SONET formatted signal, for creating a SONET formatted signal therefrom by inserting at least path and transport overhead information in said substantially SONET signal, a first multiplexer means for receiving and multiplexing at least three of said SONET signals from a plurality of said SONET path terminating means to create a first STSn formatted signal where n is greater than one.

a second multiplexer means for receiving, multiplexing, and scrambling a plurality of said first STSn formatted signals to create a second STSn formatted signal where n is greater than three, and a line interface means for receiving said second STSn formatted signal, for providing a second bit serial STSn formatted signal therefrom, where n is greater than three, and for interfacing said second STSn formatted signal to said STSn line of same bit rate.

25. A system according to claim 21, wherein, said transmitting means is coupled to a DS-3 compatible transmission line, and comprises means for extracting twenty-eight virtual tributaries from said substantially SONET formatted signal, and second converting means for converting said twenty-eight virtual tributaries into a substantially DS-3 formatted signal, said second converting means comprising means for stuffing said twenty-eight virtual tributaries into twenty-eight DS-1 formatted signals and means for building a substantially DS-3 formatted signal from said twenty-eight DS-1 formatted signals.

26. A system according to claim 21, further comprising:

non-blocking wide band cross-connecting means including a plurality of data ports and a plurality of associated clock ports, and means for cross-connecting at least said substantially SONET formatted signals received at a first data port along with an associated clock signal received at an associated clock port to respective any of said plurality of data ports and associated clock ports, wherein at least a first group of said plurality of data ports and associated clock ports are coupled to said receiving means, and at least a second group of said plurality of data ports and associated clock ports are coupled to said transmitting means.

27. A system according to claim 1, wherein:

said converting means comprises means for receiving a DS-3 formatted signal, means for demultiplexing said DS-3 signal into at least twenty-eight constituent DS-1 signals, means for stuffing said DS-1 signals into twenty-eight virtual tributaries, and means for providing overhead signals, to create therefrom a substantially SONET formatted signal.

28. A system according to claim 27, wherein:

said cross-connection means comprises at least a virtual tributary cross-connection means, said virtual tributary cross-connection means comprising, SONET signal receiving means for receiving a plurality of substantially SONET formatted signals, including means for disassembling said substantially SONET formatted signals into virtual tributary payloads of tracked phase, and means for cross-connecting said virtual tributary payloads in space, time, and phase to generate new substantially SONET formatted signals.

29. A system according to claim 28, further comprising:

(d) transmitting means coupled to said virtual tributary cross-connection means and coupled to one of DSn, CEPTn, and STSn compatible transmission lines for transmitting a cross-connected substantially SONET formatted signal over one of said DSn, CEPTn, and STSn compatible transmission lines.

30. A system according to claim 29, wherein:

said transmitting means is coupled to an STS-1 line and comprises a SONET path terminating means coupled to said virtual tributary cross-connection means for receiving a substantially SONET formatted signal, for creating a bit serial SONET formatted signal output therefrom by inserting at least path and transport overhead information in said substantially SONET signal, and for providing line interface functions to permit said bit serial SONET formatted signal to be transmitted on said STS-1 line.

31. A system according to claim 29, wherein:

said transmitting means is coupled to an STSn line, where n is greater than one, and said transmitting means comprises a SONET path terminating means coupled to said virtual tributary cross-connection means for receiving a substantially SONET formatted signal, for creating a SONET formatted signal therefrom by inserting at least path and transport overhead information in said substantially SONET signal, and a multiplexer means for receiving and multiplexing at least two of said SONET signals from a plurality of said SONET path terminating means to create a bit serial STSn formatted output signal where n is greater than one, and for providing line interface functions to permit said bit serial STSn formatted signal to be transmitted on said STSn line.

32. A system according to claim 29, wherein:

said transmitting means is coupled to an STSn line, where n is greater than three, and said transmitting means comprises a SONET path terminating means coupled to said virtual tributary cross-connection means for receiving a substantially SONET formatted signal, for creating a SONET formatted signal therefrom by inserting at least path and transport overhead information in said substantially SONET signal, a first multiplexer means for receiving and mutiplexing at least three of said SONET signals from a plurality of said SONET path terminating means to create a first STSn formatted signal where n is greater than one, a second multiplexer means for receiving, multiplexing, and scrambling a plurality of said first STSn formatted signals to create a second STSn formatted signal where n is greater than three, and a line interface means for receiving said second STSn formatted signal, for providing a second bit serial STSn formatted signal therefrom, where n is greater than three, and for interfacing said second STSn formatted signal to said STSn line of same bit rate.

33. A system according to claim 29, wherein:

said transmitting means is coupled to an asynchronous DS-1 compatible transmission line and to a substantially SONET formatted bus, said transmitting means comprising means for extracting at least one virtual tributary from said substantially SONET formatted bus, and second means for converting converts each extracted virtual tributary into an asynchronous DS-1 compatible signal at a like rate to a DS-1 compatible transmission line to which it is coupled.

34. A system according to claim 33, further comprising:

(e) said substantially SONET formatted bus coupled to said transmitting means, wherein said substantially SONET formatted bus transports said substantially formatted SONET signal in byte-parallel fashion in conjunction with at least an associated clock, and said transmitting means includes parallel-serial data conversion means for receiving data in a parallel format and providing a serial format representation thereof.

35. A system according to claim 29, further comprising:

non-blocking wide band cross-connecting means including a plurality of data ports and a plurality of associated clock ports, and means for cross-connecting at least said substantially SONET formatted signals received at a first data port along with an associated clock signal received at an associated clock port to respective any of said plurality of data ports and associated clock ports, wherein at least a first group of said plurality of data ports and associated clock ports are coupled to said receiving means, and at least a second group of said plurality of data ports and associated clock ports are coupled to said transmitting means.

36. A system according to claim 27, further comprising:

(d) transmitting means coupled to an asynchronous DS-1 compatible transmission line and to a substantially SONET formatted bus, said transmitting means comprising means for extracting at least one virtual tributary from said substantially SONET formatted bus, and second means for converting each extracted virtual tributary into an asynchronous DS-1 compatible signal at a like rate to a DS-1 compatible transmission line to which it is coupled, wherein said cross-connection means comprises said substantially SONET formatted bus, said substantially SONET formatted bus further coupled to said converting means which supplies a substantially SONET formatted signal.

37. A system according to claim 36, further comprising:

non-blocking wide band cross-connecting means including a plurality of data ports and a plurality of associated clock ports, and means for cross-connecting at least said substantially SONET formatted signals received at a first data port along with an associated clock signal received at an associated clock port to respective any of said plurality of data ports and associated clock ports, wherein at least a first of said plurality of data ports and an associated clock port are coupled to said receiving means, and at least a second of said plurality of data ports and an associated clock ports are coupled to said transmitting means.

38. A modular, expandable cross-connect system for high speed digital signals, comprising:

(a) receiving means for receiving at least one substantially SONET formatted signal;

(b) cross-connection means coupled to said receiving for cross-connecting said received signal; and (c) converting means coupled to said cross-connection means for converting into a format other than a substantially SONET formatted signal said cross-connected substantially SONET formatted signal.

39. A system according to claim 38, wherein:

said cross-connection means comprises at least a virtual tributary cross-connection means, said virtual tributary cross-connection means comprising, SONET signal receiving means for receiving a plurality of substantially SONET formatted signals, including means for disassembling said substantially SONET formatted signals into virtual tributary payloads of tracked phase, and means for cross-connecting said virtual tributary payloads in space, time, and phase to generate new substantially SONET formatted signals.

40. A system according to claim 39, further comprising:

(d) transmitting means for transmitting said cross-connected converted signal over one of a DSn and CEPTn compatible transmission line, wherein, said converting means comprises means for extracting at least part of one virtual tributary form said substantially SONET formatted signal, and for converting said at least part of one virtual tributary into one of a DSn and CEPTn signal.

41. A system according to claim 40, wherein:

said transmitting means is coupled to a DS-3 compatible transmission line, said means for extracting extracts twenty-eight virtual tributaries from said substantially SONET formatted signal, and said means for converting further comprises means for stuffing said twenty-eight virtual tributaries into twenty-eight DS-1 formatted signals and means for building a substantially DS-3 formatted signal from said twenty-eight DS-1 formatted signals.

42. A system according to claim 40, wherein:

said transmitting means is coupled to an asynchronous DS-1 compatible transmission line, and said means for converting converts each extracted virtual tributary into an asynchronous DS-1 compatible signal at a like rate to a DS-1 compatible transmission line to which it is coupled.

43. A system according to claim 40, wherein:

said transmitting means is coupled to a synchronous DS-1 compatible transmission line, and said means for converting converts each extracted virtual tributary into a synchronous DS-1 compatible signal at a like rate to a DS-1 compatible transmission line to which it is coupled.

44. A system according to claim 40, wherein:

said transmitting means is coupled to an asynchronous CEPTn compatible transmission line, and said means for converting converts each extracted virtual tributary into an asynchronous CEPTn compatible signal at a like rate to a CEPTn compatible transmission line to which it is coupled.

45. A system according to claim 40, wherein:

said transmitting means is coupled to a synchronous CEPTn compatible transmission line, and said means for converting converts each extracted virtual tributary into a synchronous CEPTn compatible signal at a like rate to a CEPTn compatible transmission line to which it is coupled.

46. A system according to claim 40, wherein:
at least a portion of said substantially SONET formatted signal is synchronous, and
said transmitting means is coupled to a DS-0 compatible interface, said means for extracting extracts at least a predefined part of a virtual tributary of said synchronous substantially SONET formatted signal, and said converting means converts said predefined part of said virtual tributary into a DS-0 format for transmittal over said DS-0 interface.

47. A system according to claim 41, wherein:
said receiving means is coupled to an STS-1 line and comprises a SONET path terminating means for interfacing said STS-1 line and said system, said SONET path terminating means being further coupled to said virtual tributary cross-connection means.

48. A system according to claim 41, wherein:
said receiving means is coupled to an STSn line and receives an STSn formatted signal, wherein n is greater than one, and comprises a demultiplexing means for demultiplexing said STSn signal into n SONET STS-1 signals, and at least n SONET path terminating means for providing substantially SONET formatted signals from each STS-1 signal, wherein at least one of said SONET path terminating means is coupled to said virtual tributary cross-connect means.

49. A system according to claim 41, wherein:
said receiving means is coupled to an STSn line and receives an STSn formatted signal, wherein n is greater than three, and comprises a first demultiplexing means for descrambling and demultiplexing said STSn signal into a plurality of unscrambled composite parts, a second demultiplexing means for demultiplexing said unscrambled composite parts into n STS-1 formatted signals, and at least n SONET path terminating means for providing substantially SONET formatted signals from each STS-1 signal, wherein at least one of said SONET path terminating means is coupled to said virtual tributary cross-connect means.

50. A system according to claim 42, wherein:
said receiving means is coupled to an STS-1 line and comprises a SONET path terminating means for interfacing said STS-1 line and said system, said SONET path terminating means being further coupled to said virtual tributary cross-connection means.

51. A system according to claim 42, wherein:
said receiving means is coupled to an STSn line and receives an STSn formatted signal, wherein n is greater than one, and comprises a demultiplexing means for demultiplexing said STSn signal into n SONET STS-1 signals, and at least n SONET path terminating means for providing substantially SONET formatted signals from each STS-1 signal, wherein at least one of said SONET path terminating means is coupled to said virtual tributary cross-connect means.

52. A system according to claim 42, wherein:
said receiving means is coupled to an STSn line and receives an STSn formatted signal, wherein n is greater than three, and comprises a first demultiplexing means for descrambling and demultiplexing said STSn signal into a plurality of unscrambled composite parts, a second demultiplexing means for demultiplexing said unscrambled composite parts into n STS-1 formatted signals, and at least n SONET path terminating means for providing substantially SONET formatted signals from each STS-1 signal, wherein at least one of said SONET path terminating means is coupled to said virtual tributary cross-connect means.

53. A system according to claim 43, wherein:
said receiving means is coupled to an STS-1 line and comprises a SONET path terminating means for interfacing said STS-1 line and said system, said SONET path terminating means being further coupled to said virtual tributary cross-connection means.

54. A system according to claim 43, wherein:
said receiving means is coupled to an STSn line and receives an STSn formatted signal, wherein n is greater than one, and comprises a demultiplexing means for demultiplexing said STSn signal into n SONET STS-1 signals, and at least n SONET path terminating means for providing substantially SONET formatted signals from each STS-1 signal, wherein at least one of said SONET path terminating means is coupled to said virtual tributary cross-connect means.

55. A system according to claim 43, wherein:
said receiving means is coupled to an STSn line and receives an STSn formatted signal, wherein n is greater than three, and comprises a first demultiplexing means for descrambling and demultiplexing said STSn signal into a plurality of unscrambled composite parts, a second demultiplexing means for demultiplexing said unscrambled composite parts into n STS-1 formatted signals, and at least n SONET path terminating means for providing substantially SONET formatted signals from each STS-1 signal, wherein at least one of said SONET path terminating means is coupled to said virtual tributary cross-connect means.

56. A system according to claim 40, further comprising:
(e) a substantially SONET formatted bus coupled to said converting and transmitting means, wherein said substantially SONET formatted bus transports said substantially formatted SONET signal in byte-parallel fashion in conjunction with at least an associated clock, and said converting means includes parallel-serial data conversion means for receiving data in a parallel format and providing a serial format representation thereof.

57. A system according to claim 56, further comprising:
non-blocking wide band cross-connecting means including a plurality of data ports and a plurality of associated clock ports, and means for cross-connecting at least said substantially SONET formatted signals received at a first data port along with an associated clock signal received at an associated clock port to respective any of said plurality of data ports and associated clock ports, wherein at least a first group of said plurality of data ports and associated clock ports are coupled to said receiving means, and at least a second group of said plurality of data ports and associated clock ports are coupled to said transmitting means.

58. A system according to claim 38, further comprising:
(d) transmitting means for transmitting said cross-connected converted signal over one of a DSn and CEPTn compatible transmission line, wherein,
said converting means comprises means for extracting at least part of one virtual tributary from said substantially SONET formatted signal, and for converting said at least part of one virtual tributary into one of a DSn and CEPTn signal, and
said cross-connection means comprises at least a substantially SONET formatted bus coupled to said converting means, wherein said substantially SONET formatted bus transports said substantially formatted SONET signal in byte-parallel fashion in conjunction with at least an associated clock, and said converting means includes parallel-serial data conversion means for receiving data in a parallel format and providing a serial format representation thereof.

59. A system according to claim 58, wherein:
said transmitting means is coupled to an asynchronous DS-1 compatible transmission line, and said means for converting converts each extracted virtual tributary into an asynchronous DS-1 compatible signal at a like rate to a DS-1 compatible transmission line to which it is coupled.

60. A system according to claim 58, wherein:
said transmitting means is coupled to a synchronous DS-1 compatible transmission line, and said means for converting converts each extracted virtual tributary into a synchronous DS-1 compatible signal at a like rate to a DS-1 compatible transmission line to which it is coupled.

61. A system according to claim 58, wherein:
said transmitting means is coupled to an asynchronous CEPTn compatible transmission line, and said means for converting converts each extracted virtual tributary into an asynchronous CEPTn compatible signal at a like rate to a CEPTn compatible transmission line to which it is coupled.

62. A system according to claim 58, wherein:
said transmitting means is coupled to a synchronous CEPTn compatible transmission line, and said means for converting converts each extracted virtual tributary into a synchronous CEPTn compatible signal at a like rate to a CEPTn compatible transmission line to which it is coupled.

63. A system according to claim 58, wherein:
at least a portion of said substantially SONET formatted signal is synchronous, and
said transmitting means is coupled to a DS-0 compatible interface, said means for extracting extracts at least a predefined part of a virtual tributary of said synchronous substantially SONET formatted signal, and said converting means converts said predefined part of said virtual tributary into a DS-0 format for transmittal over said DS-0 interface.

64. A system according to claim 58, further comprising:
non-blocking wide band cross-connecting means including a plurality of data ports and a plurality of associated clock ports, and means for cross-connecting at least said substantially SONET formatted signals received at a first data port along with an associated clock signal received at an associated clock port to respective any of said plurality of data ports and associated clock ports, wherein at least a first group of said plurality of data ports and associated clock ports are coupled to said receiving means, and at least a second group of said plurality of data ports and associated clock ports are coupled to said transmitting means.

65. A system according to claim 59, wherein:
said receiving means is coupled to an STS-1 line and comprises a SONET path terminating means for interfacing said STS-1 line and said system, said SONET path terminating means being further coupled to said virtual tributary cross-connection means.

66. A system according to claim 59, wherein:
said receiving means is coupled to an STSn line and receives an STSn formatted signal, wherein n is greater than one, and comprises a demultiplexing means for demultiplexing said STSn signal into a n SONET STS-1 signals, and at least n SONET path terminating means for providing substantially SONET formatted signals from each STS-1 signal, wherein at least one of said SONET path terminating means is coupled to said virtual tributary cross-connect means.

67. A system according to claim 59, wherein:
said receiving means is coupled to an STSn line and receives an STSn formatted signal, wherein n is greater than three, and comprises a first demultiplexing means for descrambling and demultiplexing said STSn signal into a plurality of unscrambled composite parts, a second demultiplexing means for demultiplexing said unscrambled composite parts into n STS-1 formatted signals, and at least n SONET path terminating means for providing substantially SONET formatted signals from each STS-1 signal, wherein at least one of said SONET path terminating means is coupled to said virtual tributary cross-connect means.

68. A system according to claim 60, wherein:
said receiving means is coupled to an STS-1 line and comprises a SONET path terminating means for interfacing said STS-1 line and said system, said SONET path terminating means being further coupled to said virtual tributary cross-connection means.

69. A system according to claim 60, wherein:
said receiving means is coupled to an STSn line and receives an STSn formatted signal, wherein n is greater than one, and comprises a demultiplexing means for demultiplexing said STSn signal into n SONET STS-1 signals, and at least n SONET path terminating means for providing substantially SONET formatted signals from each STS-1 signal, wherein at least one of said SONET path terminating means is coupled to said virtual tributary cross-connect means.

70. A system according to claim 60, wherein:
said receiving means is coupled to an STSn line and receives an STSn formatted signal, wherein n is greater than three, and comprises a first demultiplexing means for descrambling and demultiplexing said STSn signal into a plurality of unscrambled composite parts, a second demultiplexing means for demultiplexing said unscrambled composite parts into n STS-1 formatted signals, and at least n SONET path terminating means for providing substantially SONET formatted signals from each STS-1 signal, wherein at least one of said SONET path terminating means is coupled to said virtual tributary cross-connect means.

71. A modular, expandable cross-connect system for high speed digital signals, comprising:
(a) at least one receiving/transmitting means for receiving at least one signal formatted in other than a substantially SONET format, and for transmitting in other than a substantially SONET format at least one cross-connected signal;
(b) converting means coupled to said receiving/transmitting means for converting into a substantially SONET formatted signal said at least one signal formatted in other than a substantially SONET format received by said receiving means, and for converting into said format other than a substantially SONET format said at least one cross-connected substantially SONET formatted signal; and
(c) cross-connection means coupled to said converting means for cross-connecting said substantially SONET formatted signal.

72. A system according to claim 71, further comprising:
(d) a DS-3/SONET converting means including
   means for extracting twenty-eight virtual tributaries from a substantially SONET formatted signal, means for stuffing said twenty-eight virtual tributaries into twenty-eight DS-1 formatted signals, and means for building a substantially DS-3 formatted signal from said twenty-eight DS-1 formatted signals, and
   means for receiving a DS-3 formatted signal, means for demultiplexing said DS-3 signal into at least twenty-eight constituent DS-1 signals, means for stuffing said DS-1 signals into twenty-eight virtual tributaries, and means for providing overhead signals, to create therefrom a substantially SONET formatted signal, wherein
   said DS-3/SONET converting means is coupled to said cross-connection means.

73. A system according to claim 72, further comprising:
(e) SONET path origination/termination means for
   receiving a substantially SONET formatted signal, creating a bit serial SONET formatted signal output therefrom by inserting at least path and transport overhead information in said substantially SONET signal, and providing line interface functions to permit said bit serial SONET formatted signal to be transmitted on an STSn line, and for
   receiving a SONET formatted signal from an STSn line and interfacing said STSn line and said system.

74. A system according to claim 73, wherein:
said cross-connection means comprises a virtual tributary cross-connection means, said virtual tributary cross-connection means comprising,
SONET signal receiving means for receiving a plurality of substantially SONET formatted signals, including means for disassembling said substantially SONET formatted signals into virtual tributary payloads of tracked phase, and
means for cross-connecting said virtual tributary payloads in space, time, and phase to generate new substantially SONET formatted signals.

75. A system according to claim 74, further comprising:
(f) a substantially SONET formatted bus coupled to at least said receiving/transmitting means, wherein said substantially SONET formatted bus transports said substantially formatted SONET signal in byte-parallel fashion in conjunction with at least an associated clock to and from said receiving/transmitting means, and said receiving means includes serial-parallel data conversion means for receiving data in a serial format and providing a parallel format representation thereof with an associated clock, and said transmitting means includes parallel-serial data conversion means for receiving data in a parallel format with an associated clock and providing a serial format representation thereof.

76. A system according to claim 75, wherein:
said receiving/transmitting means and said converting means together comprise an add/drop multiplexer means.

77. A system according to claim 76, wherein:
a plurality of receiving/transmitting means and converting means are provided and comprise at least a plurality of said add/drop multiplexer means, each add/drop multiplexer means having said receiving/transmitting means for receiving one of a DSn and CEPTn formatted signal, said converting means for converting said one of a DSn and CEPTn signal into at least a part of a virtual tributary format signal, and means for placing said at least a part of a virtual tributary format signal in an appropriate time frame on said substantially SONET formatted bus such that said at least a part of a virtual tributary format signal is part of a substantially SONET formatted signal.

78. A system according to claim 77, wherein:
said plurality of add/drop multiplexer means comprise
an asynchronous DS-1 add/drop multiplexer for receiving an asynchronous DS-1 formatted signal, for converting said asynchronous DS-1 signal into an asynchronous virtual tributary format signal, and for inserting said asynchronous virtual tributary format signal onto said substantially SONET formatted bus at appropriate times,
a synchronous DS-1 add/drop multiplexer for receiving a synchronous DS-1 formatted signal, for converting said DS-1 signal into a synchronous virtual tributary format signal, and for inserting said asynchronous virtual tributary format signal onto said substantially SONET formatted bus at appropriate times.

79. A system according to claim 78, wherein:
said plurality of add/drop multiplexer means further comprise
a synchronous DS-0 add/drop multiplexer for receiving a DS-0 formatted signal, for converting said DS-0 signal into a part of a synchronous virtual tributary format signal, and for inserting said part of a synchronous virtual tributary format signal onto said substantially SONET formatted bus at appropriate times.

80. A system according to claim 79, wherein:
said plurality of add/drop multiplexer means further comprise
a synchronous and an asynchronous CEPTn add/drop multiplexers for respectively receiving synchronous and asynchronous CEPTn formatted signals, for respectively converting said synchronous and asynchronous CEPTn into virtual tributary format signals, and for respectively inserting said virtual tributary format signals onto said substantially SONET formatted bus at appropriate times 81. A system according to claim 77, further comprising:

(g) non-blocking wide band cross-connecting means including a plurality of data ports and a plurality of associated clock ports, and means for cross-connecting at least said substantially SONET formatted signals received at a first data port along with an associated clock signal received at an associated clock port to respective any of said plurality of data ports and associated clock ports, wherein at least a first group of said plurality of data ports and associated clock ports are coupled to said receiving means, and at least a second group of said plurality of data ports and associated clock ports are coupled to said transmitting means.

* * * * *